(12) United States Patent
Hutchins et al.

(10) Patent No.: US 10,950,067 B2
(45) Date of Patent: Mar. 16, 2021

(54) VEHICLE DATA ACQUISITION AND ACCESS SYSTEM AND METHOD

(71) Applicant: ARCHIVE AUTO, INC., South San Francisco, CA (US)

(72) Inventors: Richard H. Hutchins, South San Fancisco, CA (US); Timothy F. Reid, South San Francisco, CA (US)

(73) Assignee: Archive Auto, Inc., South San Francisco, CA (US)

( * ) Notice: Subject to any disclaimer, the term of this patent is extended or adjusted under 35 U.S.C. 154(b) by 0 days.

(21) Appl. No.: 16/655,710

(22) Filed: Oct. 17, 2019

(65) Prior Publication Data

US 2020/0126324 A1    Apr. 23, 2020

Related U.S. Application Data

(63) Continuation-in-part of application No. PCT/US2019/012948, filed on Jan. 9, 2019.

(60) Provisional application No. 62/746,699, filed on Oct. 17, 2018, provisional application No. 62/615,095, filed on Jan. 9, 2018.

(51) Int. Cl.
*G07C 5/00* (2006.01)
*G07C 5/08* (2006.01)
*H04L 9/32* (2006.01)

(52) U.S. Cl.
CPC ........... *G07C 5/008* (2013.01); *G07C 5/0808* (2013.01); *G07C 5/0858* (2013.01); *H04L 9/3239* (2013.01); *G07C 2205/02* (2013.01)

(58) Field of Classification Search
CPC .... G07C 5/008; G07C 5/0808; G07C 5/0858; H04L 9/3239

USPC ....................................................... 701/32.6
See application file for complete search history.

(56) References Cited

U.S. PATENT DOCUMENTS

| 4,989,144 A | 1/1991 | Barnett, III |
| 5,001,714 A | 3/1991 | Stark et al. |
| 5,056,056 A | 10/1991 | Gustin |
| 5,065,321 A | 11/1991 | Bezos et al. |
| 5,127,005 A | 6/1992 | Oda et al. |

(Continued)

FOREIGN PATENT DOCUMENTS

| CN | 102700480 A | 10/2012 |
| TW | 482140 U | 4/2002 |

(Continued)

OTHER PUBLICATIONS

The International Search Report and Written Opinion rendered by the International Searching Authority for PCT/US19/12948, dated Mar. 26, 2019; 16 pages.

(Continued)

*Primary Examiner* — Peter D Nolan
*Assistant Examiner* — Luat T Huynh
(74) *Attorney, Agent, or Firm* — Skaar Ulbrich Macari, P.A.

(57) ABSTRACT

Systems and methods to securely retrieve, process, and archive (e.g., via cloud systems) vehicle events, vehicle status, vehicle owner data, and historical data. The system provides real-time, or event-based, vehicle data acquisition to facilitate verifiable and accurate information. True and accurate vehicle data can be accessed by various companies, entities, and government agencies under a subscription service, or on a per-event basis.

20 Claims, 20 Drawing Sheets

(56) References Cited

U.S. PATENT DOCUMENTS

| | | | |
|---|---|---|---|
| 5,185,700 A | 2/1993 | Bezos et al. | |
| 5,361,201 A | 11/1994 | Jost et al. | |
| 5,493,729 A | 2/1996 | Nigawara et al. | |
| 5,521,815 A | 5/1996 | Rose, Jr. | |
| 5,598,511 A | 1/1997 | Petrinjak et al. | |
| 5,623,403 A | 4/1997 | Highbloom | |
| 5,790,427 A | 8/1998 | Greer et al. | |
| 5,899,978 A | 5/1999 | Irwin | |
| 5,899,985 A | 5/1999 | Tanaka | |
| 5,917,405 A | 6/1999 | Joao | |
| 6,339,736 B1 | 1/2002 | Moskowitz et al. | |
| 6,525,672 B2 | 2/2003 | Chainer et al. | |
| 6,615,186 B1 | 9/2003 | Kolls | |
| 6,718,239 B2 | 4/2004 | Rayner | |
| 6,795,759 B2 | 9/2004 | Doyle | |
| 7,003,289 B1 | 2/2006 | Kolls | |
| 7,180,407 B1 | 2/2007 | Guo et al. | |
| 7,236,690 B2 | 6/2007 | Matsukawa | |
| 7,359,821 B1 | 4/2008 | Smith et al. | |
| 7,703,291 B2 | 4/2010 | Bushnik et al. | |
| 7,783,956 B2 | 8/2010 | Ko et al. | |
| 8,140,358 B1 | 3/2012 | Ling et al. | |
| 8,412,546 B2 | 4/2013 | Smith et al. | |
| 8,447,459 B2 | 5/2013 | Lowrey et al. | |
| 8,527,485 B2 | 9/2013 | Marzani et al. | |
| 8,538,785 B2 | 9/2013 | Coleman et al. | |
| 9,032,493 B2 * | 5/2015 | Lortz | H04L 63/104 726/7 |
| 9,659,417 B2 | 5/2017 | Rybak et al. | |
| 10,037,633 B2 | 7/2018 | Gintz et al. | |
| 2002/0032626 A1 | 3/2002 | DeWolf et al. | |
| 2002/0143646 A1 | 10/2002 | Boyden et al. | |
| 2002/0194051 A1 | 12/2002 | Hall et al. | |
| 2004/0243588 A1 | 12/2004 | Tanner et al. | |
| 2005/0114270 A1 | 5/2005 | Hind et al. | |
| 2006/0212195 A1 | 9/2006 | Veith et al. | |
| 2007/0132773 A1 | 6/2007 | Plante | |
| 2007/0135979 A1 | 6/2007 | Plante | |
| 2007/0135980 A1 | 6/2007 | Plante | |
| 2007/0136078 A1 | 6/2007 | Plante | |
| 2007/0150138 A1 | 6/2007 | Plante | |
| 2007/0219685 A1 | 9/2007 | Plante | |
| 2008/0111666 A1 | 5/2008 | Plante et al. | |
| 2008/0122603 A1 | 5/2008 | Plante et al. | |
| 2008/0147266 A1 | 6/2008 | Plante et al. | |
| 2008/0147267 A1 | 6/2008 | Plante | |
| 2008/0281485 A1 | 11/2008 | Plante et al. | |
| 2009/0006118 A1 | 1/2009 | Pollak | |
| 2009/0150118 A1 | 6/2009 | Naima | |
| 2010/0033614 A1 | 2/2010 | Yoo et al. | |
| 2010/0262470 A1 | 10/2010 | Nielsen et al. | |
| 2011/0130894 A1 | 6/2011 | Kim et al. | |
| 2011/0130906 A1 | 6/2011 | Mayer | |
| 2011/0130916 A1 | 6/2011 | Mayer | |
| 2012/0117050 A1 | 5/2012 | Vasudevan et al. | |
| 2012/0179325 A1 | 7/2012 | Faenger | |
| 2013/0134730 A1 * | 5/2013 | Ricci | G08G 1/16 296/24.34 |
| 2013/0151065 A1 | 6/2013 | Ricci | |
| 2013/0332578 A1 | 12/2013 | Carroll | |
| 2014/0002651 A1 | 1/2014 | Plante | |
| 2014/0040434 A1 | 2/2014 | Rybak et al. | |
| 2014/0129047 A1 * | 5/2014 | Barrett | G07C 5/00 701/1 |
| 2014/0142802 A1 | 5/2014 | Lin | |
| 2014/0310186 A1 | 10/2014 | Ricci | |
| 2017/0324817 A1 | 11/2017 | Oliveira et al. | |
| 2017/0337573 A1 * | 11/2017 | Toprak | G07C 5/006 |
| 2017/0352082 A1 * | 12/2017 | Aziz | G06Q 30/0278 |
| 2019/0251759 A1 | 8/2019 | Lora et al. | |

FOREIGN PATENT DOCUMENTS

| | | |
|---|---|---|
| WO | 2017142536 A1 | 8/2017 |
| WO | 2017201522 A1 | 11/2017 |

OTHER PUBLICATIONS

Mitch Becker; Planning for Scanning; BodyShop Business; Sep. 2017; 10 pages.
Mitch Becker; Pre- and Post-Repair Scanning; BodyShop Business; Apr. 2017; 7 pages.
Industry Update; BodyShop Business; Nov. 2017; 2 pages.
Erica Eversman; Can you Afford $42 Million; BodyShop Business; Nov. 2017; 6 pages.
Subaru of America, Inc.; Position Statement; 2 pages.
Scanning for Electrical System Faults; Collision Repair Information, Jul. 2016; 1 page.
MBUSA Collision Position Statement; 1 page.
Infiniti USA; Position Statement; Sep. 15, 2016; 1 page.
Honda: American Honda Position Statement; Jul. 2016; 3 pages.
Mopar; Scan Tool Position Statement; 1 page.
GM Service Information; Position Statement; Pre- and Post-Scan Collision Vehicles; Oct. 2016; 2 pages.

* cited by examiner

VEHICLE DATA ACQUISITION AND ACCESS SYSTEM AND METHOD

PRIORITY

This application is a Continuation-In-Part of International PCT Application No. PCT/US2019/012948, filed Jan. 9, 2019, which claims priority to and the benefit of U.S. Provisional Patent Application No. 62/615,095, filed Jan. 9, 2018, and U.S. Provisional Patent Application No. 62/746,699, filed Oct. 17, 2018; with each of the referenced applications and disclosures incorporated fully herein by reference.

TECHNICAL FIELD

The present invention relates generally to systems, methods, and computer programs for acquiring, transferring, processing, archiving, and securing vehicle data, including event, status, and historical data.

BACKGROUND OF THE INVENTION

Proposed or contemplated legislation in the U.S., and elsewhere, may require vehicle repair facilities (e.g., mechanical, auto body, etc.) to do a "health check" both on intake and delivery of a vehicle to ensure that all problems have been attended to. This is a major operational shift in the vehicle repair field. As such, OEMs (Original Equipment Manufacturers) are making a push for scan-in/scan-out health checks with OBD (On Board Diagnostics such as OBD-II) or like systems.

The current methods of storing, accessing relevant vehicle data, and the type of data that is accessible, is very limited, fragmented, and decentralized. This restricts access to needed vehicle data and jeopardizes the accuracy of the vehicle data.

In addition, the current methods lack adequate security and privacy protections desired or required to protect a vehicle owner's sensitive data and information made available to persons, entities, and the like.

As such, there is a need for new and improved systems and methods of collecting, processing, archiving, securing, searching, and retrieving a vast array of relevant and important vehicle data.

SUMMARY OF THE INVENTION

The systems and methods of the present invention solve many of the inherent deficiencies currently present in vehicle data acquisition and dissemination. Particular embodiments of the system are adapted to retrieve, process, and archive (e.g., via cloud systems) vehicle data, such as event, status, and historical data. The system provides real-time, or event-based, vehicle data acquisition to facilitate verifiable and accurate historical information on a vehicle.

The system of the present invention can include a vehicle data computing device or module, one or more cloud servers/services, and can communicate with one or more remote user computing devices. For instance, the vehicle computing module can store every function the vehicle performs, every error code, and a myriad of other relevant data. That data can then be communicated or transferred to an accessible cloud server. In certain embodiments, the system users can include vehicle vendors, departments of motor vehicles (DMVs), insurance companies, consumers, government agencies, vehicle repair facilities/technicians, and the like.

Embodiments of the present invention can implement an immutable and secure network to provide reasonable, legal, and redacted or protected information for consumption about vehicle repair history, sale information, and other documentation types around automotive record keeping. This implementation can include the employment of particular data security technology, such as Blockchain and other technologies.

The system stores multiple types of data, including vehicle telematics data, vehicle repair shop documentation, OEM product documentation, and the like. When vehicle owner information is gathered and stored, it needs to be protected. Exemplary sensitive owner information can include names, addresses, phone numbers, etc. Vehicle telematics data can include vehicle identification and performance statistics. OEM product data can include VIN-specific vehicle documentation from the OEM to assist in vehicle customization information, parts lists, and repair procedures specific to the vehicle.

The system architecture and deployment strategy for embodiments of the present invention provides a secure third-party data warehousing solution. The system provides a repository that allows for structured data rules that empower vehicle owners by giving them access to their vehicle data, e.g., right in their vehicle. It also allows for opt-in programs for vehicle owners to share data at their discretion.

Further, the systems and methods of the present invention provide specific data and OEM information about each vehicle sold by the OEM, e.g., down to the "punch list" itemized features ordered by the consumer. Having a wealth of data in the vehicle, accessible via the infotainment or other vehicle systems, secured by the customers' vehicle access (such as access via a key or like FOB), provides a vehicle data vault that gives consumers preferred and deserved control.

The present invention can include two modes for protecting sensitive personal information: "data in flight," and "data at rest." Data in flight is data moving from one location to another by some form of communication, e.g., local networking, Internet TCP/IP networks, and the like. The data in flight can be protected by SSH credential security, with complex (e.g., 4096 bit) security hashes—highly encrypted to allow files to be transferred to and from the cloud server by the vehicle computer or module. Data at rest is data stored in a computing system configured with access and connectivity to the Internet, or in a discreet computer system, with the data secured in encrypted databases.

The implementation of data security in the industry will bring cost savings to all consumers of vehicle data and add value to the repair process by providing a bridge into specific vehicle information for the OEM. In addition, the process is optimized with specific parts lists and repair procedures for the subject options ordered.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure to enable a person skilled in the pertinent art to make and use the embodiments disclosed herein. In the drawings, like reference numbers indicate identical or functionally similar elements.

DETAILED DESCRIPTION

Referring generally to FIGS. 1-20, exemplary systems, devices, methods, computer programs, or software application systems are adapted to retrieve, process, and archive (e.g., via cloud systems) vehicle events, status, and historical data. The system 100 provides real-time, or event-based, vehicle data acquisition to facilitate verifiable and accurate historical information on a vehicle. This, in turn, supports a current focus in the industry on the interpolation of vehicle repair information.

The system 100 of the present invention is configured to collect a plurality of information or data on an event basis, or at scheduled intervals. This data provides an uninterrupted, unedited, reliable, and accurate history of the vehicle from "birth" to "death" of that vehicle. As detailed herein, one or more electronic vehicle modules (e.g., linked to the vehicle's Vehicle Identification Number (VIN)) can be provided with the vehicle and can communicate with software of the present invention and an analyzer or system (e.g., OBD-II) such that all of the relevant information regarding the vehicle can be stored at the vehicle and in one or more remote servers, such as cloud servers, for centralized access.

The system 100 is specifically designed to obtain and store consumable data relative to the vehicle, generally void of personal information about the owner when needed. However, the system 100 can store sensitive personal information for several use cases. Due to this, it is necessary that embodiments of the system 100 include heightened security controls and protocols.

Figure 1:
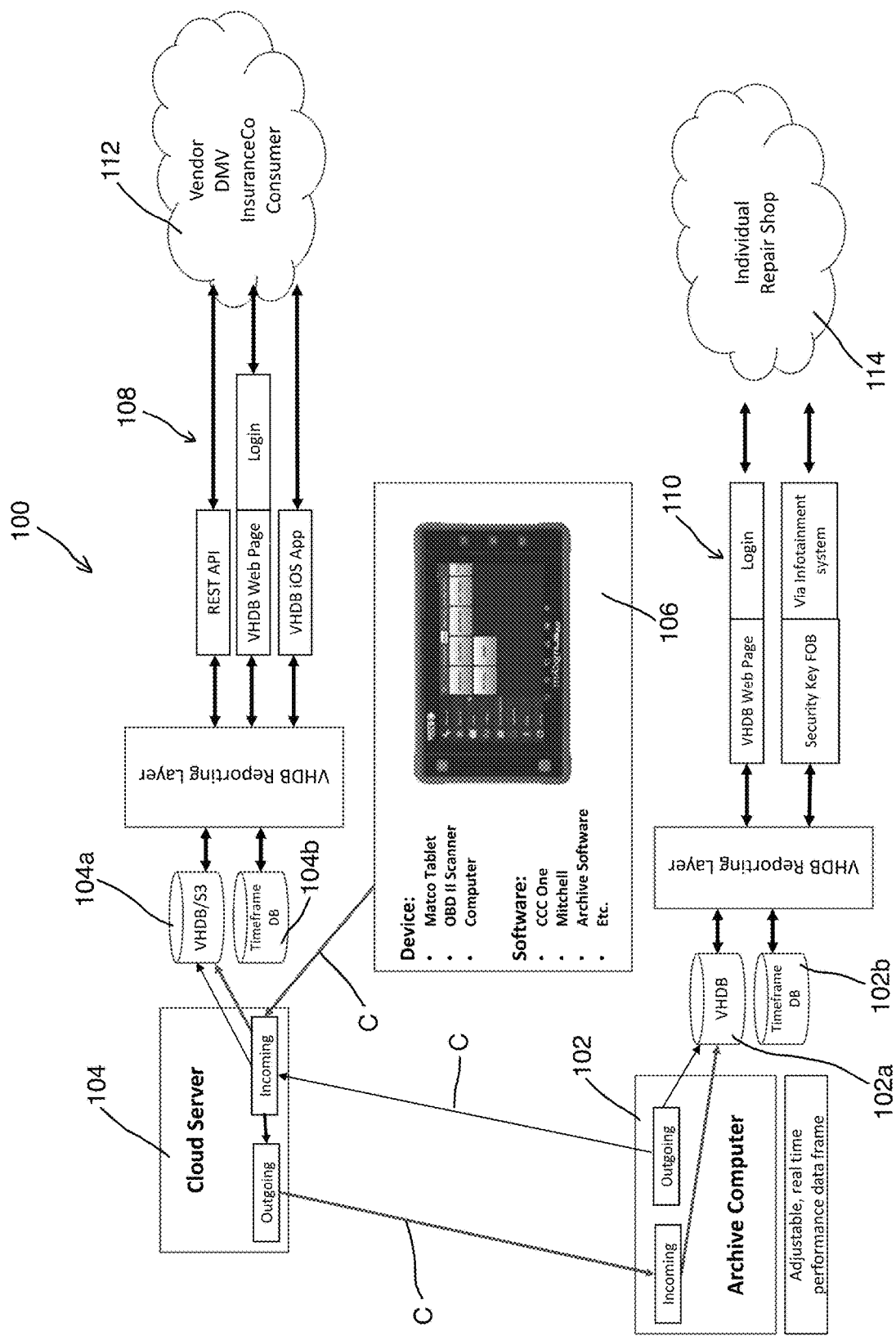
FIG. 1 is a diagram of the hardware and software aspects of a vehicle data acquisition and access system, in accordance with embodiments of the present invention.

Referring to FIG. 1, in various embodiments, the system 100 can include a vehicle data computing device or module 102 (e.g., Archive Computer), one or more cloud servers/services 104 (e.g., Archive Cloud), and one or more user systems or devices 106. The vehicle module 102 is operatively connected to, and in operative communication with, the vehicle's CAN (Controller Area Network) bus/network, its ECU (Electronic Control Unit) device, and other in-vehicle computing devices. The module 102 can be retrofitted with the vehicle for communication with the ECU, or it can be integrated as a separate computing device or included with the in-vehicle computer. The module 102 is configured to communicate with the cloud server 104 across one or more networks or communication elements or channels C—e.g., cellular, satellite, the Internet, a transponder, or other wireless or wired communication means or protocols. The communications or data transfers across element C can include use of the AWS platform, SDK tools, remote administration protocols (e.g., SSH (secure shell)), and a myriad of other tools, protocols, and platforms. Each of the user devices, systems, and servers of the present invention can both receive vehicle data from, and send/transmit vehicle data to, other devices, systems, and servers of the system 100, as well as process and analyze that data.

Specific software applications are included with the cloud service 104 and the module 102 to facilitate the described processing of data, device communications, data storage, etc. Further, a VHDB (Vehicle History Database) 104*a* and a timeframe or temporal database 104*b* are provided with the cloud service 104, and a VHDB 102a and a timeframe database 102b can be included with the module 102.

The system 100 provides interaction with various users, interacting via computing devices or systems 112, 114 to permit operative communication with the cloud service 104 and the module 102, respectively. In certain embodiments, the users 112 can include vendors, DMVs, insurance companies, consumers, agencies, and the like. These users 112 can access the cloud database with a VIN or a batch of VINs. The users 114 can include individuals, vehicle owners, service technicians, repair shops, etc. The users 114 can access all data in the local database in the vehicle. In various embodiments, the local vehicle database will include only one VIN for the subject vehicle itself. Communication between the users 112 and the cloud service 104 can be facilitated by various interfaces, web pages, protocols, mobile or desktop applications, login requirements, and APIs at one or more linking elements 108, which can include communications via the Internet. These interface configurations can also be provided via one or more linking elements 110 to facilitate operative communication between users 114 and module 102 and/or cloud service 104. Again, various interfaces, web pages, protocols, mobile or desktop applications, login requirements, and APIs can be employed. Interfacing via element 110 can be facilitated with hardware devices (e.g., key FOBs), information systems (e.g., infotainment), and the like as well.

The devices 106 can be in operative communication with the server 104 to send and receive the referenced exemplary vehicle data, which can execute software (e.g., CCC One™, Mitchell™, system 100 software, etc.) on various computing hardware, such as tablets, desktop or mobile computing devices, OBD-II scanners, etc.

Exemplary data that can be retrieved, processed, and archived can include, but are not limited to, current and true odometer readings, gauge or vehicle system, system warnings, current and past GPS locations, maintenance information, accident or damage information, repairs and official inspections that have been performed during the lifetime of the vehicle, vehicle performance data, vehicle operation and functionality data, and the like. This data can be stored in multiple places in various embodiments of the present invention. First, the data can be stored in the subject vehicle at module 102. As such, the owner/driver of the vehicle, technicians, and law enforcement or other agencies will have direct access to bona fide information of prior work/repairs, performance history, and other relevant vehicle data. Secondly, this data can be uploaded to the cloud server 104, allowing client users (e.g., service subscribers) access to information in many different ways, which creates multiple potential revenue streams, as further detailed herein.

The diagrams of FIGS. 2-11 depict and describe the data processing, hardware architecture, software applications, interfaces, and uploading and downloading methods of the system 100, including between the vehicle module 102, the user devices 112, 114, and the cloud server 104.

Figure 2:
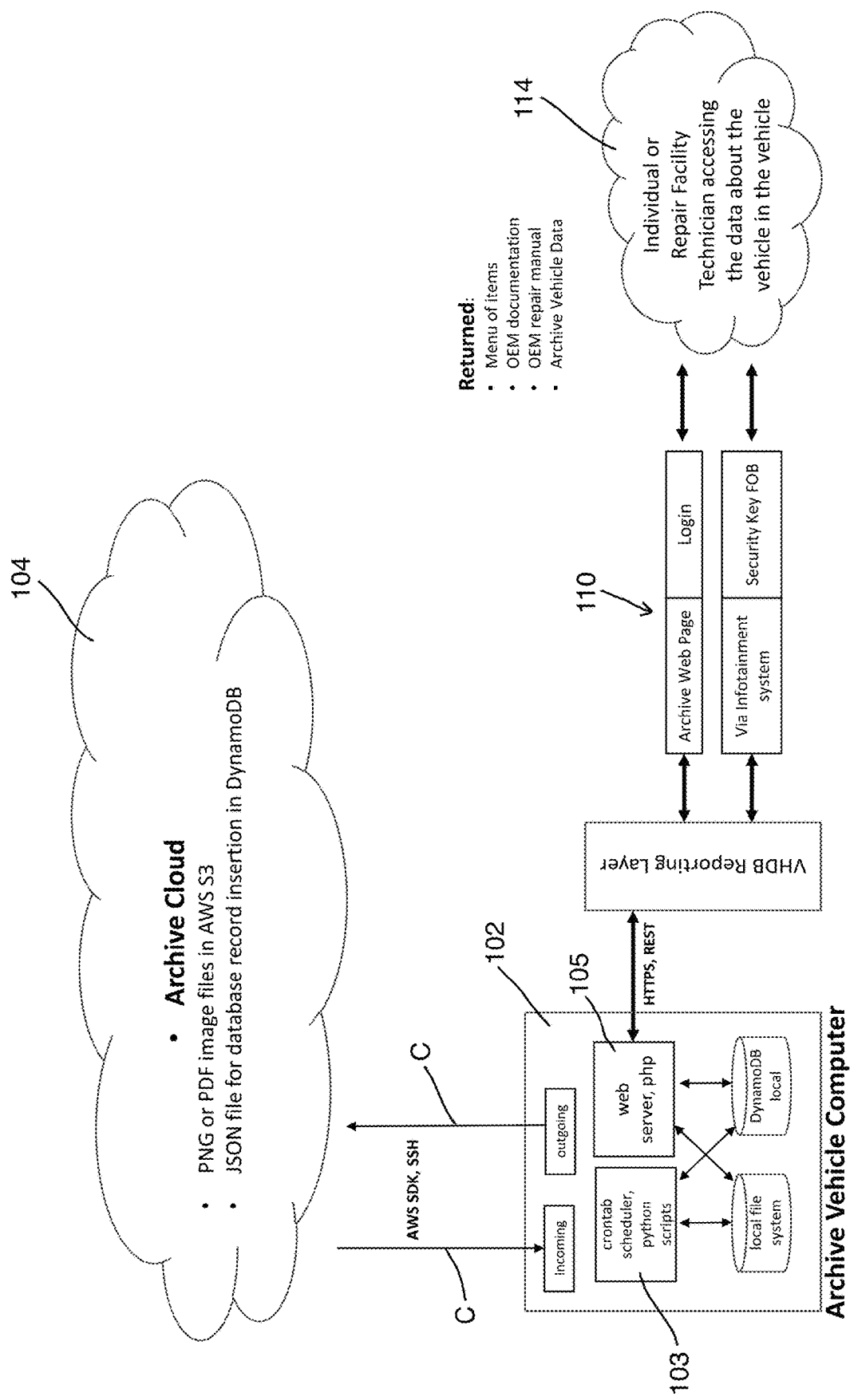
FIG. 2 is a diagram of a user device interacting and receiving vehicle data via a vehicle data computing module, in accordance with embodiments of the present invention.

As shown in FIG. 2, the user device 114 is in operative communication with the vehicle module 102 via the one or more interface elements 110 such that the module 102 processes, stores, and/or presents the vehicle data. The module 102 communicates with the cloud service 104 via the one or more communication links C. Various scripts, scheduling tools, and other communication and processing languages/protocols can be employed to facilitate this processing and data transfer—such as Crontab Scheduler™, Python™ and PHP scripts, Web Server protocols, and the like. Further, the user device 114, such as an individual or repair facility/technician, can obtain in return the following information or data: a menu of items, OEM documentation, OEM repair manuals, relevant vehicle data, etc.

Figure 3:
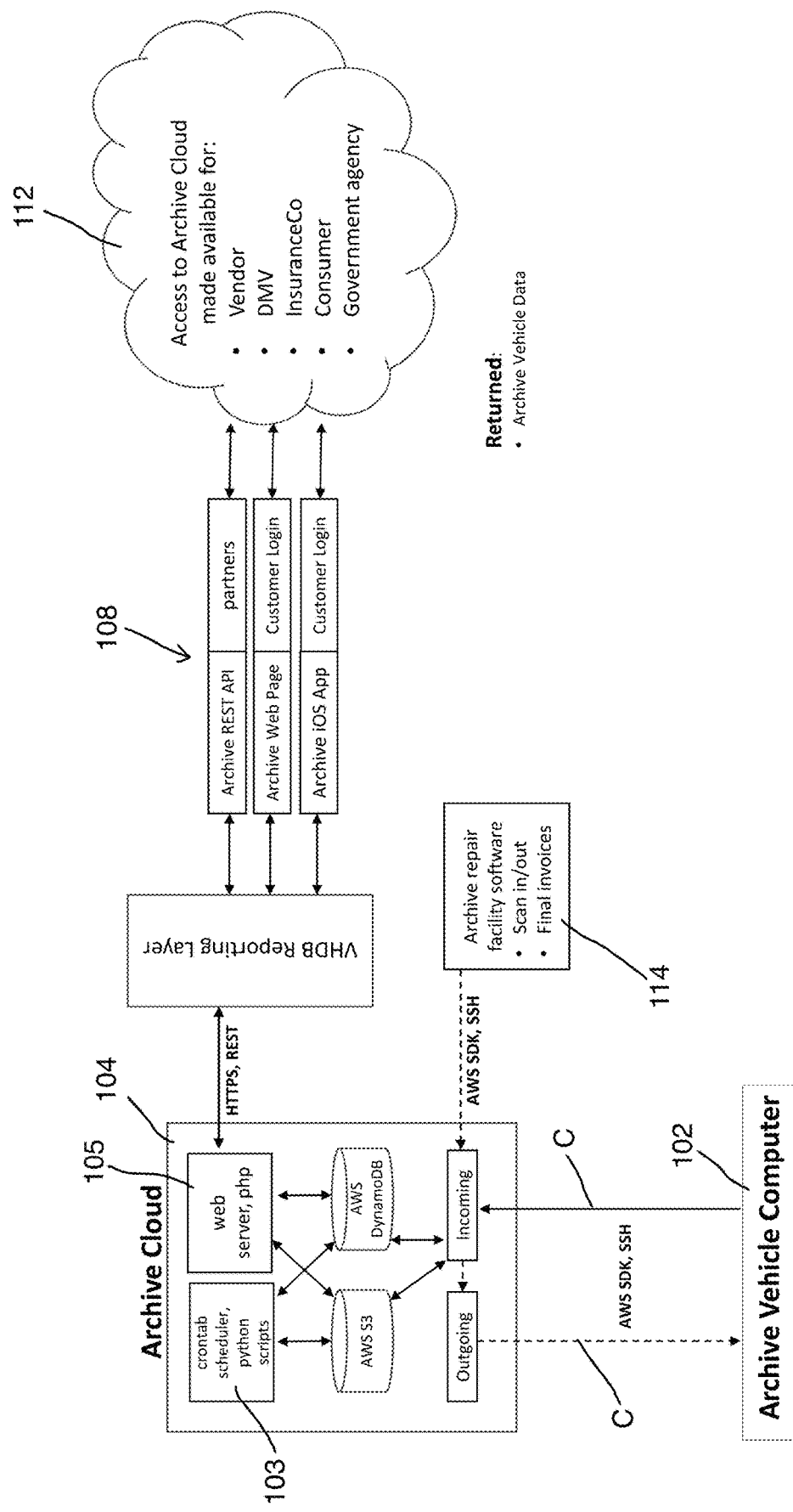
FIG. 3 is a diagram of a user device interacting and receiving vehicle data via a cloud service or server, in accordance with embodiments of the present invention.

Referring to FIG. 3, the user device 112 is in operative communication with the cloud service 104 via the one or more linking elements 108, and the cloud server 104 is in operative communication with the vehicle module 102 via the one or more communication elements C. Again, the module 102 communicates with the cloud service 104 via the one or more communication links C, using the various disclosed scripts, scheduling tools, and other communication and processing languages/protocols to facilitate the processing and data transfer. In addition, the user device 114 can run or execute repair facility software to obtain the relevant vehicle data in return, to scan the vehicle in and out, prepare final invoices, and the like.

Figure 4:
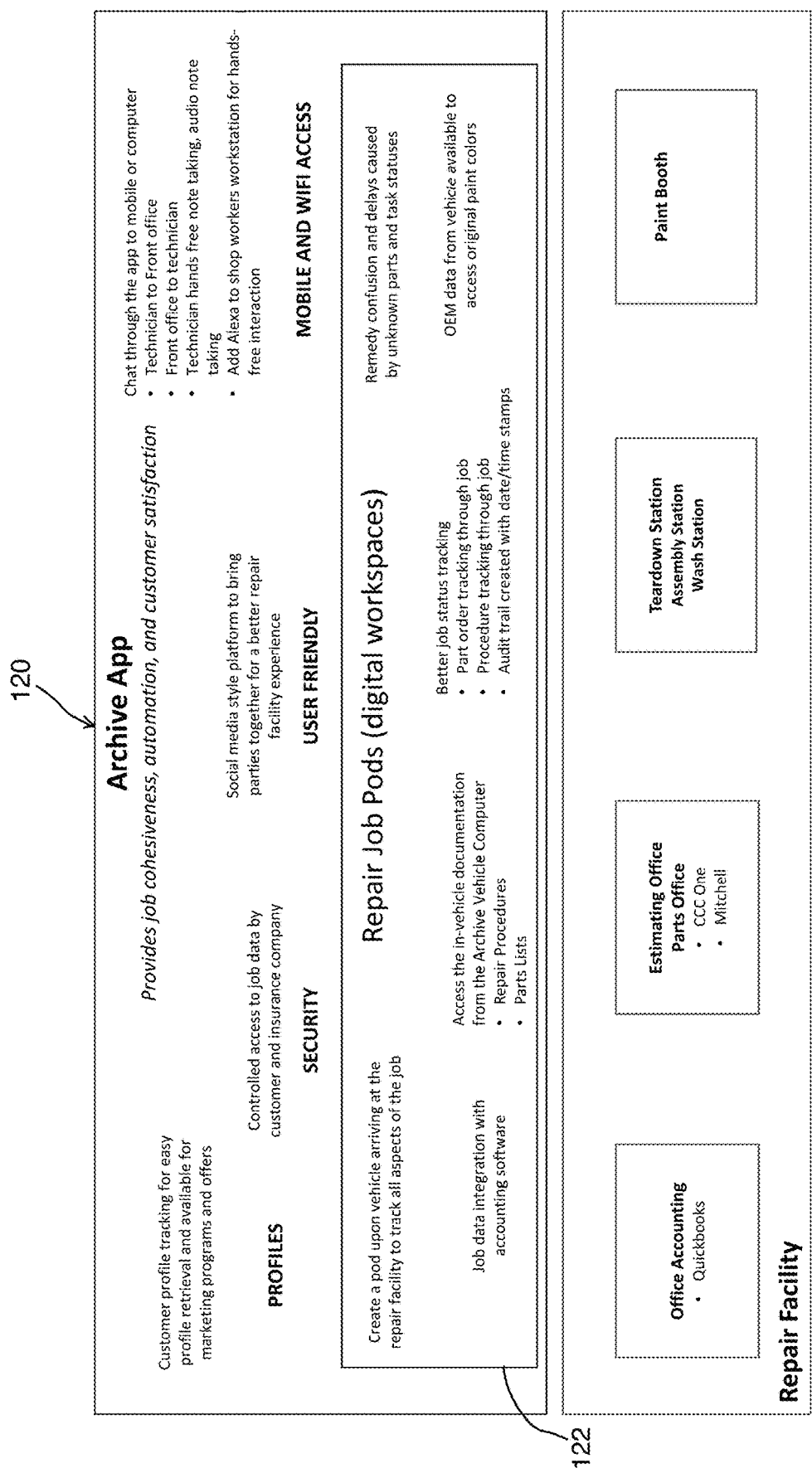
FIGS. 4-5 are diagrams of vehicle data acquisition and access software integration and use with a vehicle repair facility, in accordance with embodiments of the present invention.

As shown in FIG. 4, the system 100 software processing and vehicle repair facility interaction is provided for exemplary embodiments. The system 100 software application/app (e.g., Archive App) 120 can run or operate on any of the computing devices described herein, including a desktop computer, a tablet, a smartphone, a technician's handheld computing device, the cloud server, etc. The software 120 provides customer profile tracking to allow for profile retrieval, controlled access to job/work data by customers and insurance companies, direct access to a social media-style platform to bring parties together for a better repair experience, and to direct chat or communication—video, text, or voice. The chat feature permits communication via the software 120 to other computing devices, such as a mobile device, a desktop computing device, a tablet, and the like. Bi-directional communication is facilitated between a technician and the repair facility office (e.g., front office), and can further include features for the technician, or any other user, to employ hands-free note taking, audio note taking, intelligent voice recognition and natural language understanding services (e.g., Alexa™, Siri™, etc.), etc.

Digital workspaces 122 can be included that comprise digital job "pods." These pods permit processing and storage of vehicle data at a common or centralized workspace in the cloud (such as the cloud server 104), or at any of the user devices and computing system and devices disclosed herein. For example, tasks relating to these digital job pods can facilitate repair order documentation, customer/vendor communications, back/front office facility interaction, supplemental repair approval, and many other tasks and communications related to vehicle repair, tracking, and overall utilization of vehicle data and vehicle services. The pods provide a common communication platform for updates, estimates, approvals, surveys, parts ordering, and the like. This makes it possible for seamless communication between the repair or vehicle facility employees, insurance companies, parts suppliers, OEMs, customers, etc. Chat (video, voice, and text), along with notifications (e.g., mobile notifications) allow for constant communication, thereby saving valuable time. For instance, repair or other vehicle shops can use these chat/pod features to collaborate with estimators for instant approval, thereby expediting repair and turn-around times. The end result is better outcomes (e.g., more/higher sales), fewer canceled appointments, increased efficiency, higher customer satisfaction, and better quality control.

With certain embodiments, a first digital pod can be created when a vehicle arrives at the repair facility to track all aspects of the work or job being performed on the vehicle. The job data can be in communication and integrated with various accounting software. The vehicle's documentation or data can be accessed from the vehicle module 102 and can be used to outline repair procedures, parts lists, costs, etc. This, in turn, facilitates better job status tracking for the vehicle by enabling part order and procedure tracking, and by creating an audit trail with date and time stamps. The digital workspaces 122 remedy confusion and delays caused by unknown parts and task statuses.

The vehicle repair facility F can interact with the system 100 and the software 120 via various user devices, systems, and servers to provide accounting access or integration (e.g., QuickBooks™), vehicle parts estimations, and by tracking, updating, and processing various tasks and station events during the repair and servicing process—including tear down stations, assembly stations, wash stations, paint booths, and the like.

Figure 5:
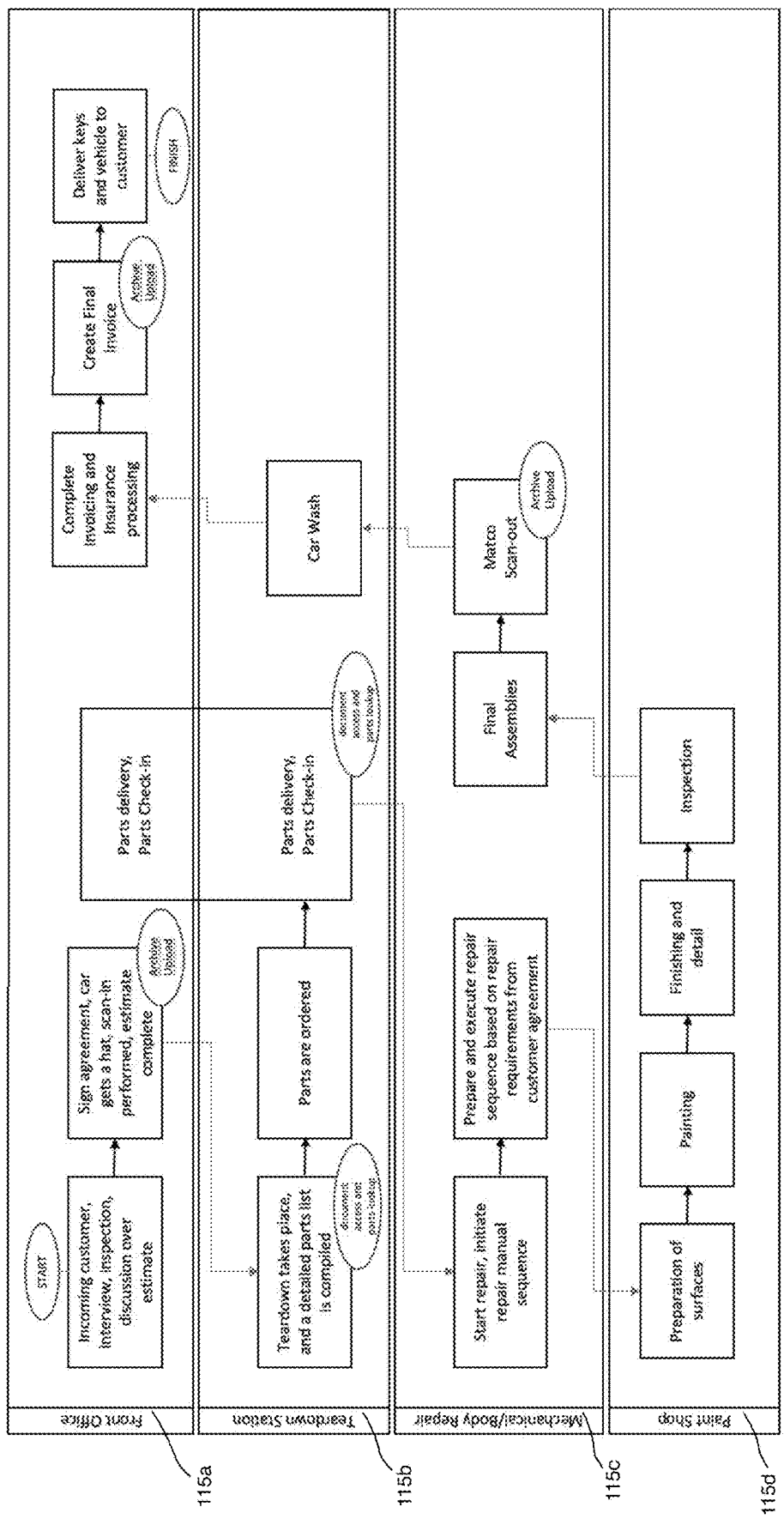

FIG. 5 diagrams integration, tracking, and procedural steps (e.g., the digital job pods) between the front office 115a and various exemplary station projects/tasks 115b-115d for the software 120. While a myriad of vehicle servicing and repair projects are envisioned for integration with the software 120 of the present invention, certain embodiments can include, but are not limited to, integration with a teardown station 115b, a mechanical/body repair station 115c, and a paint shop station 115d.

Figure 6:
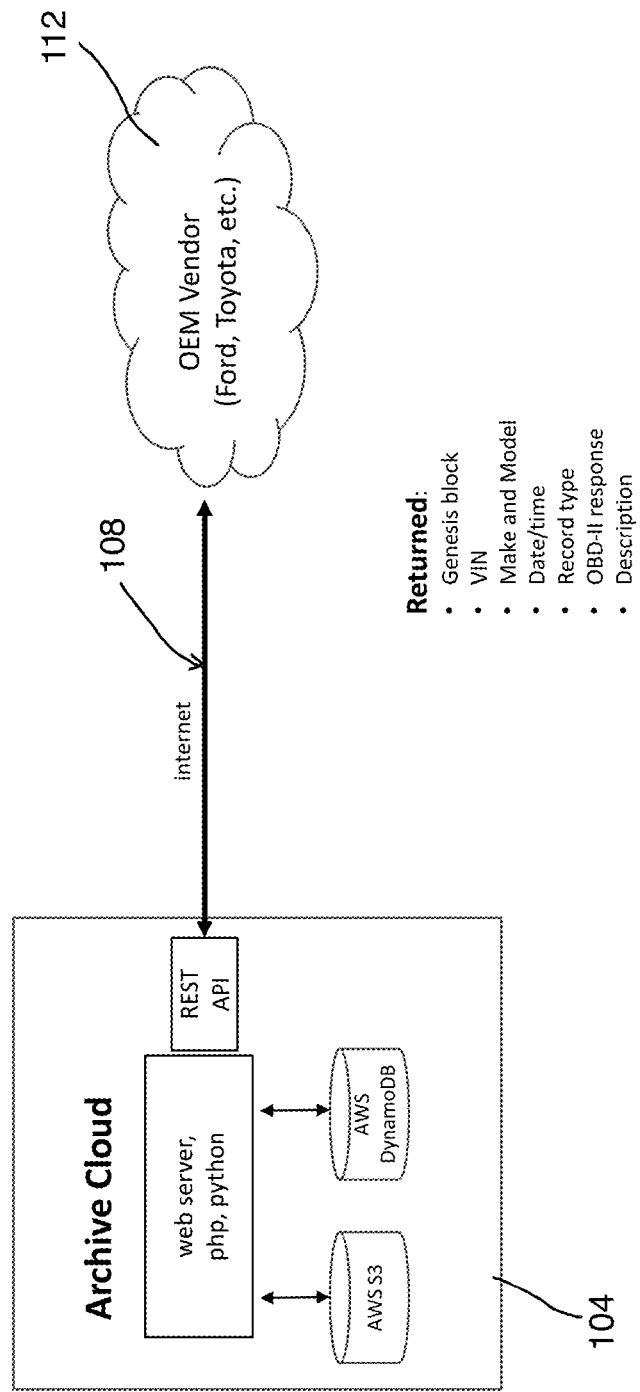
FIG. 6 is a diagram of a vehicle manufacturer user device interacting and receiving vehicle data via a cloud service or server, in accordance with embodiments of the present invention.

FIGS. 6-9 illustrate communication and interaction between user devices 112 and the cloud service or server 104. For instance, the embodiment of FIG. 6 shows the vehicle manufacturer devices 112 of the present invention 100 receiving the following from the server 104: a "genesis block" (the first block of encrypted blockchain data), a vehicle VIN, vehicle make and model, the date and time, the record type, the OBD-II response, and descriptions.

Figure 7:
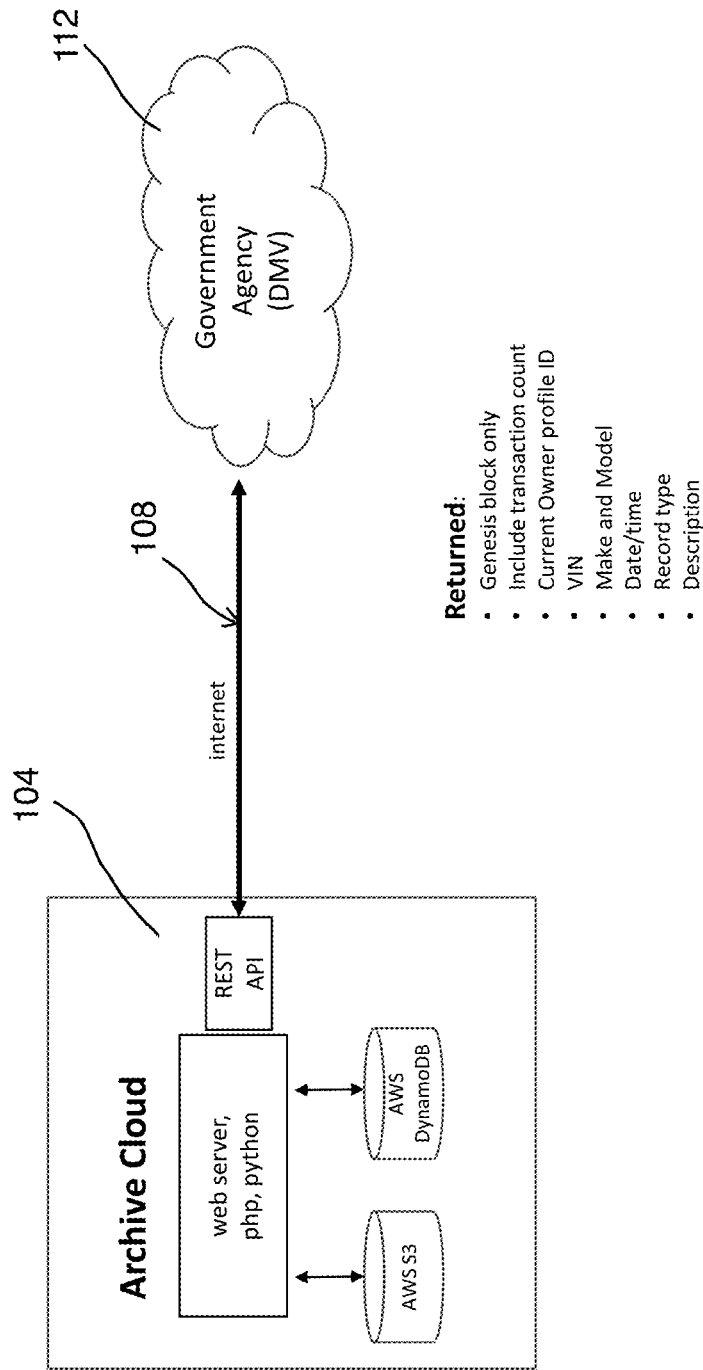
FIG. 7 is a diagram of an agency user device interacting and receiving vehicle data via a cloud service or server, in accordance with embodiments of the present invention.

The embodiment of FIG. 7 shows that a government agency device 112, such as the DMV, can receive the following information: a genesis block, a transaction count, current vehicle owner profile ID, the vehicle VIN, the vehicle make and model, the date and time, the record type, and descriptions.

Figure 8:
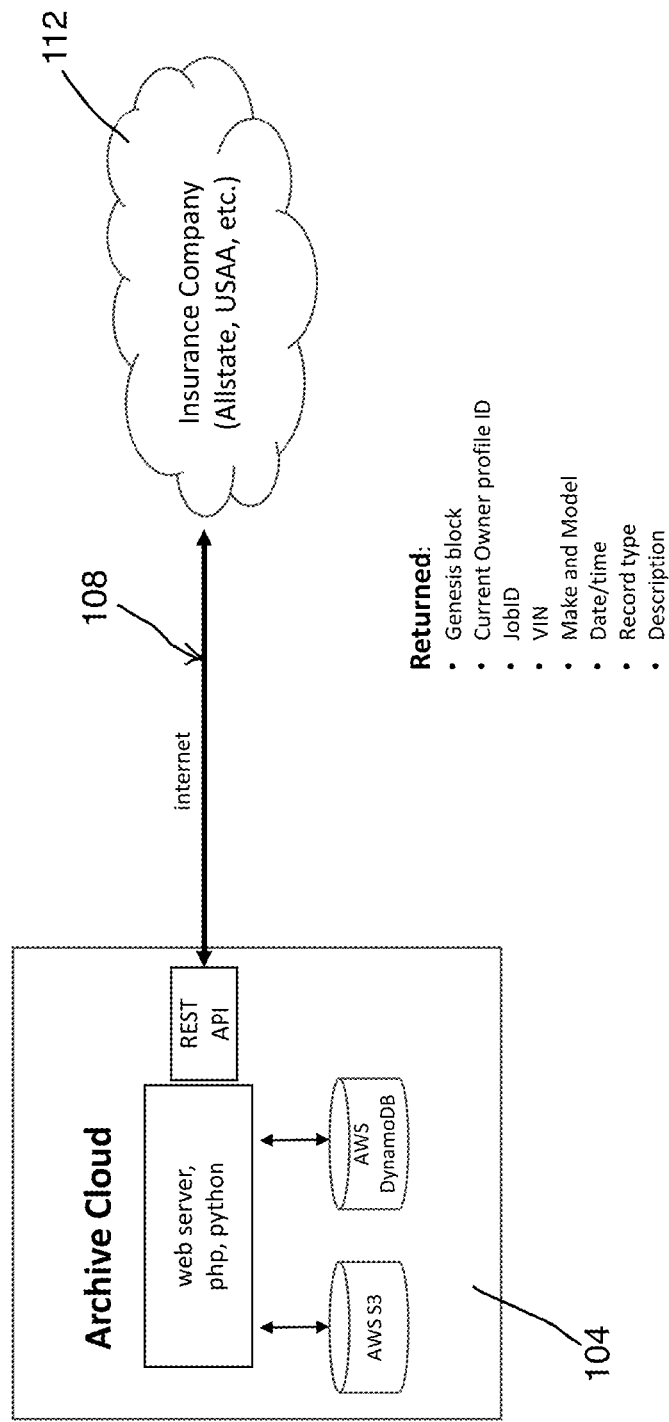
FIG. 8 is a diagram of an insurance company user device interacting and receiving vehicle data via a cloud service or server, in accordance with embodiments of the present invention.

FIG. 8 provides a diagram of the following data an insurance company device 112 can receive in example embodiments: a genesis block, a current owner profile ID, a job ID, the vehicle VIN, the vehicle make and model, the date and time, the record type, and descriptions.

Figure 9:
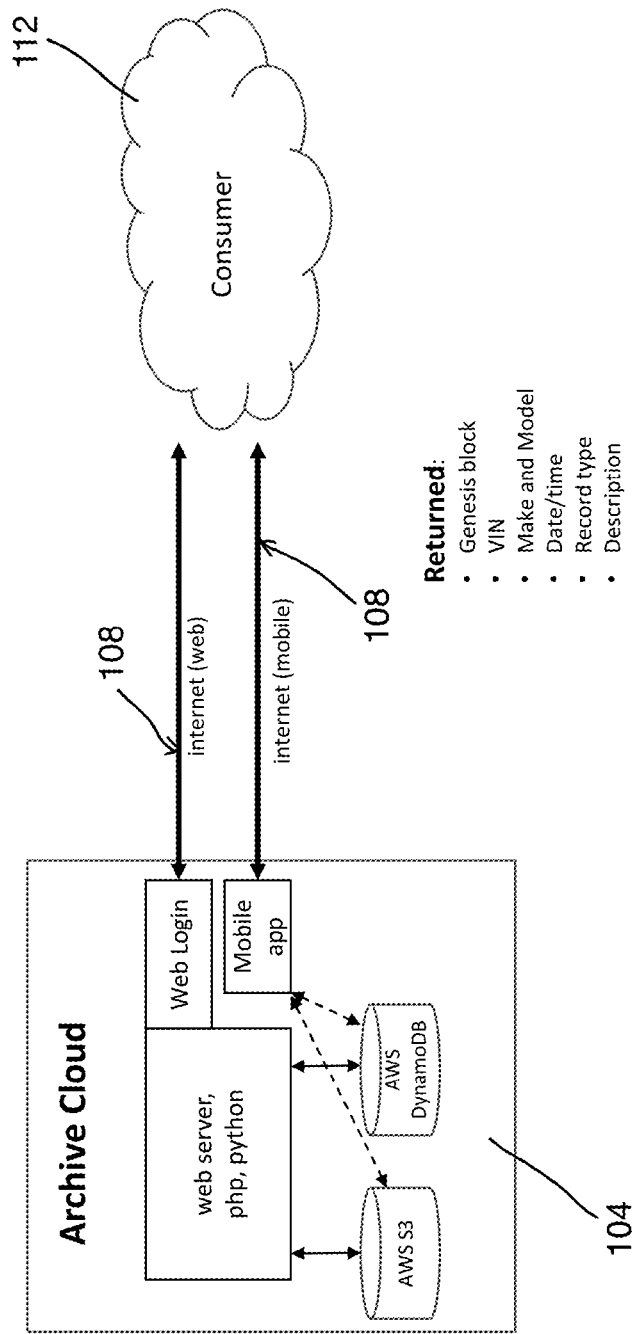
FIG. 9 is a diagram of a consumer user device interacting and receiving vehicle data via a cloud service or server, in accordance with embodiments of the present invention.

The embodiment of FIG. 9 illustrates the following information that can be received from the cloud server 104 by a consumer device 112: a genesis block, the vehicle VIN, the vehicle make and model, the date and time, the record type, and descriptions. Like other disclosed methods and means for communication between the computing devices 112, 114 and the cloud server 104, the embodiment of FIG. 9 further shows communication and data access over the Internet, via a web login or a mobile app.

Figure 10:
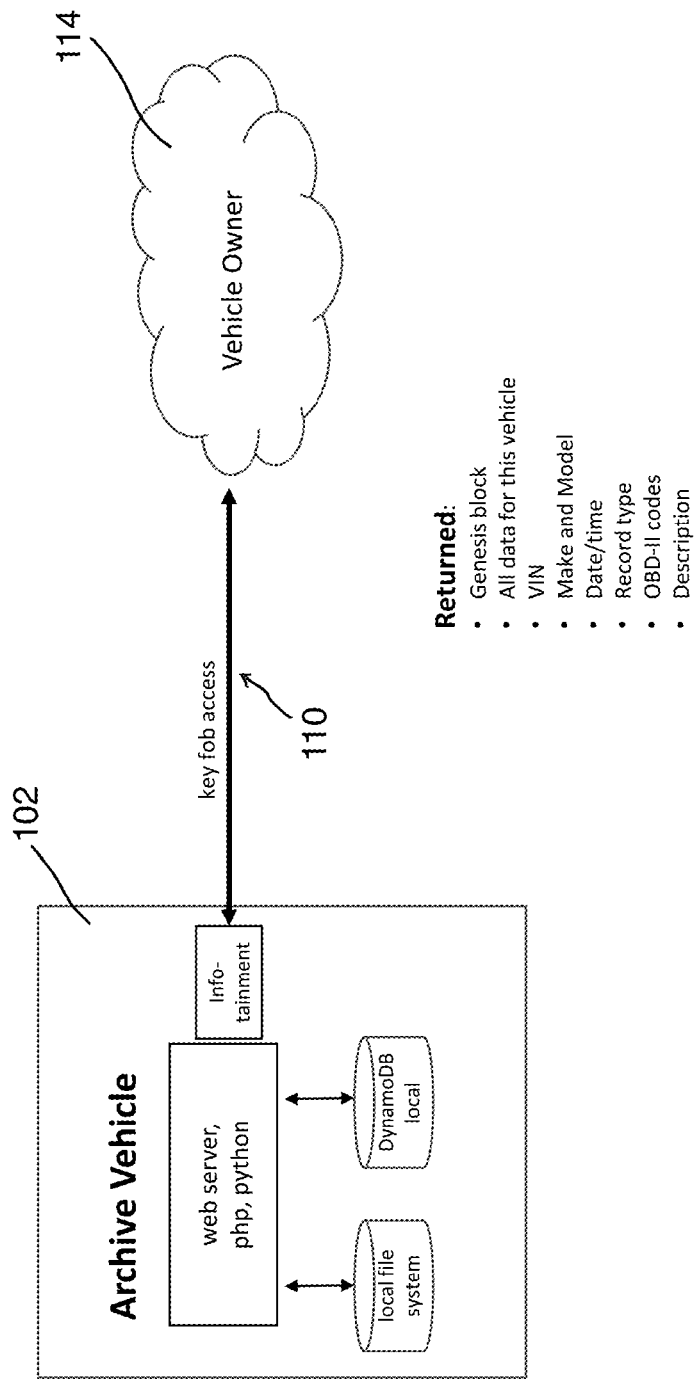
FIG. 10 is a diagram of a vehicle owner interacting and receiving vehicle data via a vehicle and/or a vehicle data computing module, in accordance with embodiments of the present invention.
Figure 11:
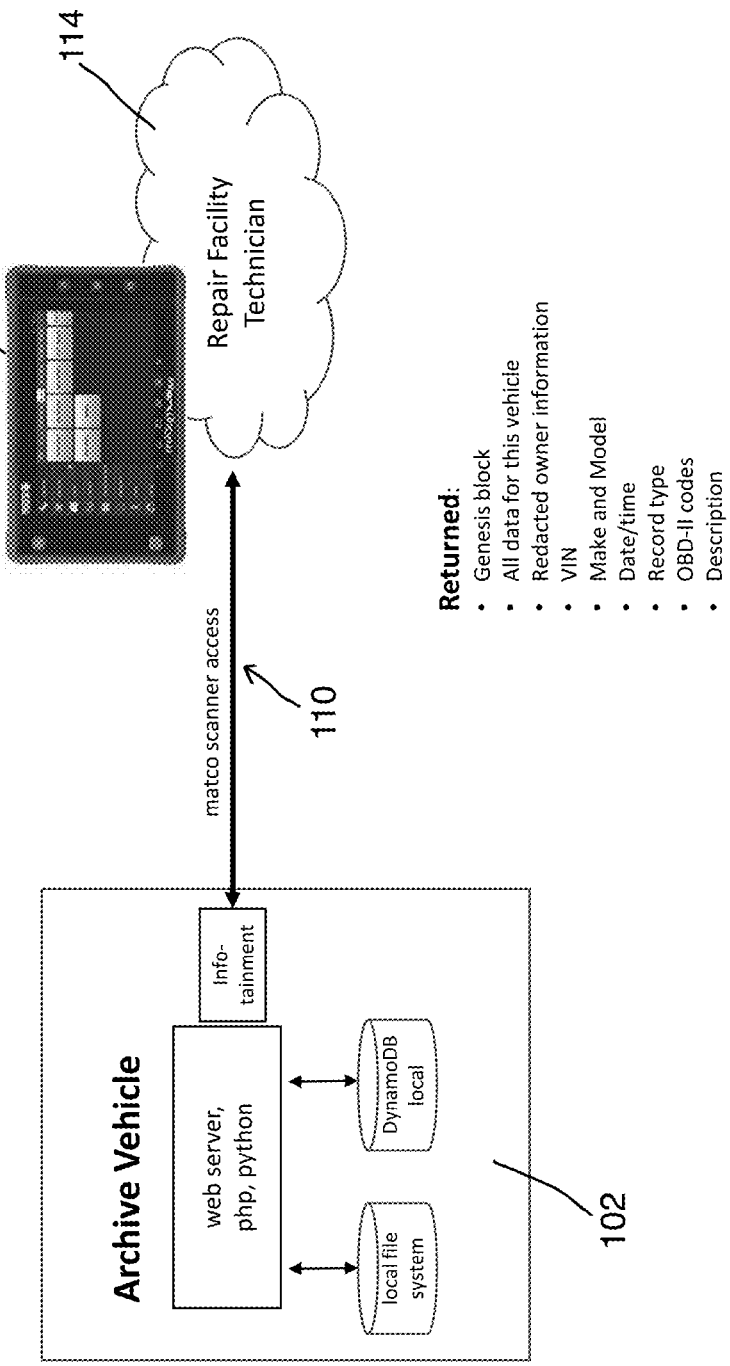
FIG. 11 is a diagram of a repair technician user device interacting and receiving vehicle data via a vehicle data computing module, in accordance with embodiments of the present invention.

FIGS. 10-11 illustrate operative communication and interactions between user devices 114, such as vehicle owner and repair technician devices, and the vehicle computing module 102. Access and communication between the device 114 and the module 102 can be facilitated via key FOB access, a technician's scanner or device 106, etc. Data or information returned to the vehicle repair facility technician, or the vehicle owner, can include the following: a genesis block, all data for the vehicle, the vehicle VIN, owner information (e.g., redacted), the vehicle make and model, the data and time, the record type, OBD-II codes, descriptions, and the like.

The following are exemplary list/tables of the various users, companies, agencies, and other entities that would benefit from access to the data and information provided with the system 100 of the present invention. This, in turn, details usage for the system, and revenue streams tied to uses of the system 100 via paid subscription or event access. This list is not intended to be exhaustive and other entity access and relevant data usage are envisioned for the system 100.
Insurance Companies
    Verify actual mileage driven (bill by mile).
    Verify registration.
    Verify actual work performed via invoice from repair facility.
    Verify "Health" check performed—OBD-II Scan in/Scan out.
    Verify vehicle location history.
    Verify vehicle history for initial coverage acceptability.
Federal Agencies—NTSB, CAFE, Law Enforcement, etc.
    Verify recalls performed.
    Bona Fide statistical analysis of data—Parts or systems failure requiring a recall, etc.
    Actual gas mileage performance.
    Hrs./routes driven (commercial).
    Actual real-time location.
    Verification of vehicle I.D.—VIN#/Unit#.
State Agencies—DMV, BAR, Law Enforcement/Judicial
    Verify actual miles driven (bill by mile).
    Verify smog certification.
    Verification of recalls performed.
    The ability to renew registration online via credit card/interface with vehicle.
    Verify current insurance.
    Verify actual repairs performed by copies of original invoices with all information.
    Locate and track through use of VIN# or Plate# to locate—e.g., Amber alerts, hot pursuits, hit and runs, stolen vehicles, etc.
OEMs—Principal Vendors
    Vehicle history.
    Warranty history searches.
    Warranty of work performed.
    Verification of work performed by certified entity.
    Research of sales and other demographics.
    Research for future recalls or complaints.
    Verification of current recalls being performed.
Used Car (Vehicle) Sales and Purchases
    Complete authentic history available to used vehicle dealer.
    Complete authentic history available to purchaser.
    History generally available with VIN# only, protecting all parties everywhere—pre-transaction.
Commercial/Enterprise (Trucking, Construction, Fleet, etc.)
    Driver logs—seamless tracking and verification of driver identity for on-road expenses, e.g., ability to sync user profile to vehicle module to pay, track, store expenses such as toll roads, fuel purchases, bridge crossings, etc.

The system 100 of the present invention can vend the vehicle data software to a myriad of entities and gather a regular stipend or subscription fee (e.g., monthly, quarterly, yearly, etc.) for this service. The system 100 can also vend the acquired and stored data to customers on a per-transaction basis. As such, a fee can be obtained from every person/entity reviewing a vehicle's current and historical data.

Certain embodiments of the system 100 can employ an immutable and secure decentralized network to provide reasonable, legal, and redacted information for public consumption about vehicle repair history, sale information, and other documentation types around automotive record keeping. One or more control points can be included with the system 100 and/or software 120. The control points can exploit or utilize flexible smart contracts (e.g., as used in blockchain technology). One or more ledger capabilities (e.g., also as used in blockchain) can be included as well. This system 100 construct provides the increased security, privacy, and access control features and methodologies disclosed herein. Other system configurations and techniques can be employed to promote increased security and automation without deviating from the spirit and scope of the present invention.

Such embodiments of the system 100 can (1) bring separate entities from varying sectors in transportation together in agreement about a record keeping paradigm, giving them a stake in and responsibility to the process, and (2) bring security up to a level that has gained a lot of attention for its immutability and security options around the creation and storing of data.

The central data repository is distributed and divided in a co-ownership scheme of the distributed nodes, and smart contract types of varying functions are created to process, store, present, and monetize transactions. This provides a next-generation platform shift to more highly scalable secure environments that cannot be hacked.

With this ecosystem of secure connectivity and backend cryptography reliability (such as blockchain), vehicle information will be generated and stored in an automated fashion such that it is happening transparent to the owner of the vehicle. Stored data has the owner information removed for public consumption, to ensure the information of the present system 100 is about the history of the vehicle. Sensitive data collected with any PAI, PII, or like regulation concerns, will be properly secured and retained for legal proceedings should the need arise, to assist in any relative investigations, and will not be available to the general public.

Insurance companies, state and federal agencies, the NTSB, OEMs, and others will all benefit from the availability of accurate and automated data about a variety of vehicle record types. Insurance companies may have the most to gain, as the system technology will afford much greater visibility into risk factors that were not previously available to them.

This security-based embodiment of the present invention provides greater automation to data gathering routines to glean consistent information about key touch points in the ownership of a vehicle. Automotive industry OEMs and the repair industry are adopting new procedural standards that are employed directly into the system 100 to make implementation transparent, resistant to errors, and simple to implement. Industry partnerships with repair facility scanner manufacturers (e.g., Matco™, Snap-on™, etc.) and repair invoice software companies (e.g., CCC Information Services™, Mitchell™, etc.) with system 100 development will render integrated software solutions that employ automated updates to enable compliance with stricter data protection and privacy policies.

Referring to FIGS. 12-20, security-based embodiments of the system 100 are specifically designed to obtain and store consumable data relative to the vehicle, generally void of personal information about the owner when needed. However, the system 100 can store sensitive personal information for several use cases. Due to this, it is necessary that the system 100 include security controls, similar to those provided for banking and financial industries. Security of personally identifiable information implements controls in compliance with organizational and federal audit standards.

It is noted that any of the security features, software, hardware, methods, and techniques disclosed in the embodiments of FIGS. 12-20 can be wholly or partially incorporated or integrated into the embodiments detailed hereinabove, including the embodiments of FIGS. 1-11. Similarly, any of the security features, software, hardware, methods, and techniques disclosed hereinabove, including those disclosed in the embodiments of FIGS. 1-11, can be wholly or partially incorporated or integrated into the embodiments detailed hereinbelow with respect to FIGS. 12-20.

The methods and protocols used in the system 100 are configured to satisfy stringent security, privacy, and audit requirements—e.g., FFIEC-style audit requirements—and other standards for handling sensitive consumer and vehicle data. The system 100 is designed to be fully compliant with the data security requirements for the market space.

As detailed herein, the system 100 stores multiple types of data, including: vehicle telematics data, vehicle repair shop documentation, OEM product documentation, and the like. Vehicle owner information particularly needs to be secured when it is stored and gathered. Personal owner information can be provided with repair shop documentation and information. The repair information relative to a particular vehicle owner can include the owner's name, address, phone number, and other sensitive personal information that must be protected. The vehicle telematics data can include the telematics data only, which contains vehicle identification and performance statistics. The OEM product data can include VIN-specific vehicle documentation from the OEM to assist in vehicle customization information, parts lists, repair procedures specific to the vehicle, etc.

The Internet and the obvious presence of black hat actors have made it necessary in the business of information technology to develop, design, test, and improve security controls on an ongoing basis. This is not only true for one-time analysis of systems, but also for an ongoing vulnerability surface analysis for all Internet-facing business resources—e.g., web pages, servers, Internet of Things (IoT) computers, mobile applications, and the like.

Security controls for servers, e.g., the cloud server 104, and the vehicle module 102 can be similar, with the same level of encryption. One difference is that the server 104 is Internet-facing and the module 102 is on a closed network within the vehicle. As Advanced Driver-Assistance systems (ADAS) become more prevalent, and self-driving features and car-to-car technologies are developed, the system 100 and its security procedures and processes will not be negatively affected because the system 100 connections do not use OEM systems. Therefore, the present invention provides a highly effective option to facilitate this increased need and desire to securely gather and protect sensitive data.

The present invention can include two modes for protecting sensitive personal information: "data in flight," and "data at rest." Data in flight is data moving from one location to another by some form of communication, e.g., local networking, Internet TCP/IP networks, and the like. Data at rest is data stored in a computing system configured with access and connectivity to the Internet, or in a discreet computer system. Storage and processing can occur at one or more servers 104, one or more computing devices, the module 102, etc.

As detailed herein, the system 100 implements role-based access controls with both the vehicle computing module 102 and the cloud server 104. Namely, permissions center around a CRUD (create, read, update, delete) approach to data access control. Specific access is assigned to users based on their assigned role within the system 100. As such, the system 100 controls the ability of a user or user account to create or write a record (e.g., input to the data cache stored), have read-only access to data, have update access to data, and the right to delete data.

The system 100 strictly controls create or write access by programmatic inputs, computer or document time-stamp driven and controlled. Certain APIs or utility script can be assigned this role. API access to the data has the potential to create CSF or XLSX output files, for example, that would be editable. The API development can, therefore, include specific controls to avoid any data interception or misuse. Further, an exported CSV or like file could not be modified and loaded back into the system 100 in certain embodiments.

Read-only access can be assigned to entities or users that have access to certain portions of data and redacted documents. Guidelines can be employed based on security and privacy requirements of various agreements or enacted legislation. For example, the software applications of the system 100 are written such that, when accessed by data consumers, the display screens are read-only and column descriptors and the corresponding data values cannot be overwritten by the consumer application—whether web-based or mobile-based.

Update access to data in the system 100 is not permitted and the data can not be modified, outside of APIs, utility scripts, and system administrator access. Software controls can be implemented to monitor file date/time stamps, which can alert system administrators when any data in the system has an updated date/time stamp. Files or database rows entering the system 100 will track creation dates and file update dates to ensure the unmodified protections and integrity of the data.

Delete access to data in the system 100 is also restricted to system administrator access. APIs and other utility scripts are not granted deletion access. Internal threats are avoided, and the administrator has a responsibility to the model and the secure nature of the system 100 as the protector and steward of the unmodified data store. The administrator's goal is to ensure that all role-based access is correct, and data will not be modified unless there is direction to do so, to correct substantiated errors in the system 100.

Vehicle Module Security

Figure 12:
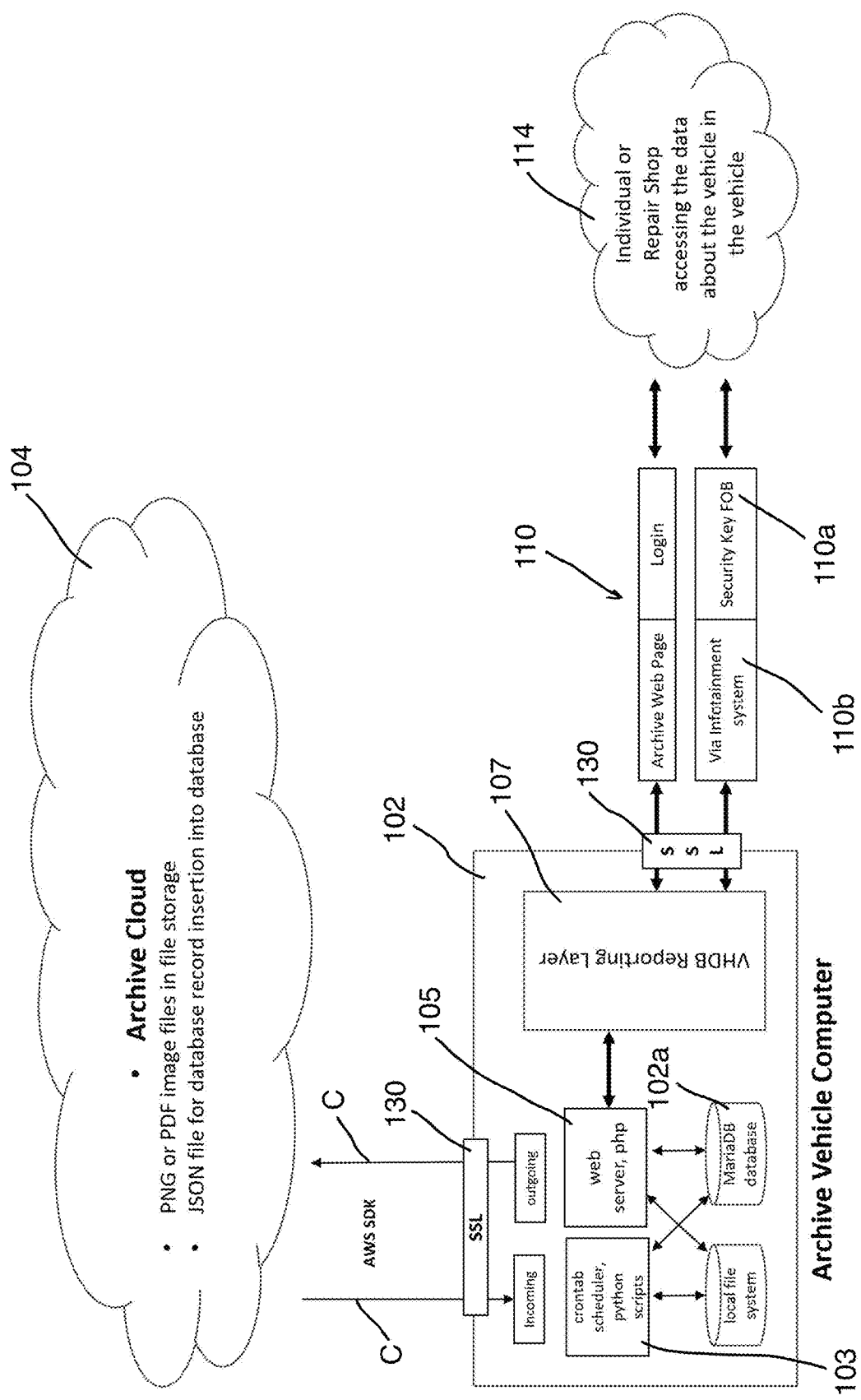
FIG. 12 is a diagram of secure communication and interaction between a user device, a vehicle data computing module, and a cloud server, in accordance with embodiments of the present invention.

FIG. 12 shows the closed communication system between the vehicle computer module 102 (e.g., IoT computer) and the cloud server 104 for various secure embodiments of the present invention. Pre-built certificate technologies 130, such as encrypted SSL links, are included that function only with the server 104 and other authorized devices and communication channels C of the system 100. The VHDB reporting layer 107 includes a web or like application that allows access to the data. It is noted that the cloud database 104*a* and the vehicle database 102*a* are similar in schema (e.g., table, columns, etc.), although they are different in scope. The cloud database 104*a* includes data for all vehicles, while the vehicle database 102*a* includes data for the subject vehicle. In exemplary embodiments, the VHDB layer 107 is the web app in the vehicle that allows the owner access to the data in the vehicle module 102 (e.g., via the infotainment system 110*b*), and further allows the vehicle owner to grant permission to a repair facility, dealership technician, etc.

The data transferred between the cloud server 104 and the vehicle module 102 through communication elements or channels C is data in flight. The transmissions are protected by SSH credential security, with complex (e.g., 4096 bit) security hashes—highly encrypted to allow files to be transferred to and from the cloud server 104 by the vehicle computer 102.

The bi-directional communication channels C of the system, including communications between the cloud server 104 and the vehicle module 102 and communications between the cloud server 104 and user computing devices 112, 114, can represent an enterprise application that employs a web-based UI with user account control, user membership in groups, and roles assigned to groups which provide access to data for the users in the groups that contain roles. An LDAP server (e.g., user account management system such as Microsoft Active Directory) is used via an Internet login web page at interaction element 110 to allow a user profile (including the group/role rights) to provide limited access to data.

As detailed above, the vehicle computer 102 includes CRUD security controls. For creating or writing, the vehicle computer 102 itself has the ability to create database rows and file system storage of files (e.g., PDFs, JPEGs, and the like). The consumer will not have command line access to the vehicle computer 102. Read-only access to the vehicle computer 102 data is granted to the vehicle owner and those who are granted permission to the vehicle's data (e.g., temporary FOB access). Update access and delete access are allowed by system administrators only, with file system and database audit logging enabled.

The vehicle computer 102 integrates with the in-vehicle infotainment 110*b* system, or other like vehicle systems, via a unique, proprietary, or dedicated channel of communication, e.g., a special USB port available to implement a secure SSL FOB device 110*a*, to ensure the current vehicle owner has complete control over who has access to the data. As a result, any repair shop and corresponding computing devices 114 that have been certified to repair vehicles will be able to access the customer's onboard history database 102*a* via the FOB 110*a* and Infotainment 110*b* systems. These data storage and access controls are included with the vehicle computer 102, which can be implemented on a Linux server platform in certain embodiments, thereby offering desirable enterprise-grade data security features. Various IoT operating systems, such as Ubuntu and Debian, provide an advantageously protective TCP/IP stack having limited open ports for communication.

Embodiments of the vehicle computer module 102 will be installed in a location inaccessible or unknown to a layman vehicle owner (e.g., "under the dash," in the engine compartment, etc.). Like an aircraft's "black box," the vehicle computer 102 is designed to be built-in to the vehicle by the OEM as one of various computer devices/modules included with the vehicle. Physical access to the computer 102 is tightly controlled through special or proprietary connectors and isolated communication channels. If the IoT computer 102 is not connected properly to the vehicle network, the vehicle ignition system will not function due to the hardware and software operatively coupled with the vehicle system. Similarly, if the IoT computer 102 is not operatively connected to the vehicle, the computer 102 will not boot or operate. These features create a fully secured in-vehicle data store that only works if installed and connected properly by the OEM.

Server Security

Figure 13:
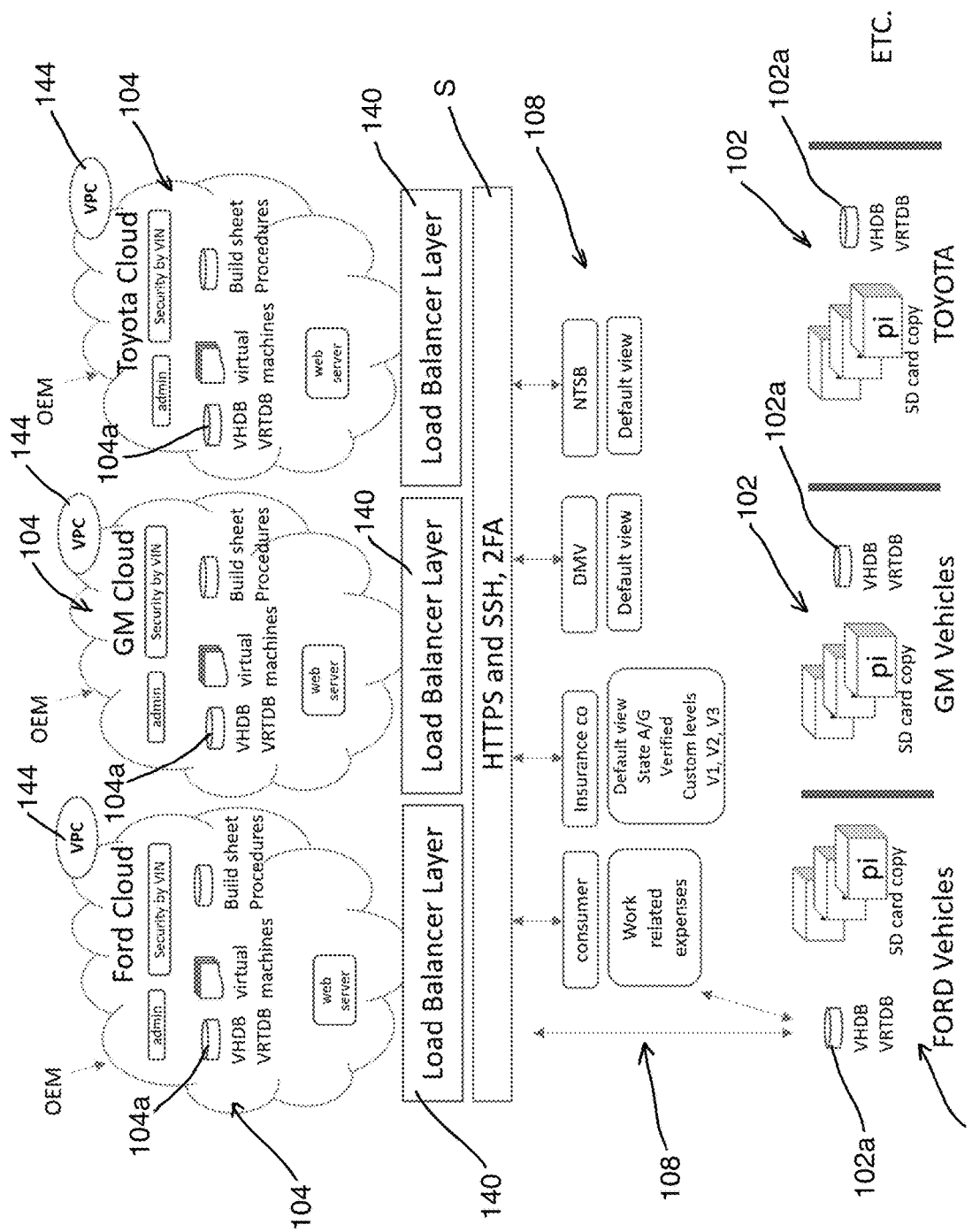
FIG. 13 is a diagram of secure communication and interaction between vehicle manufacturers/OEMs and vehicle data computing modules, in accordance with embodiments of the present invention.
Figure 14:
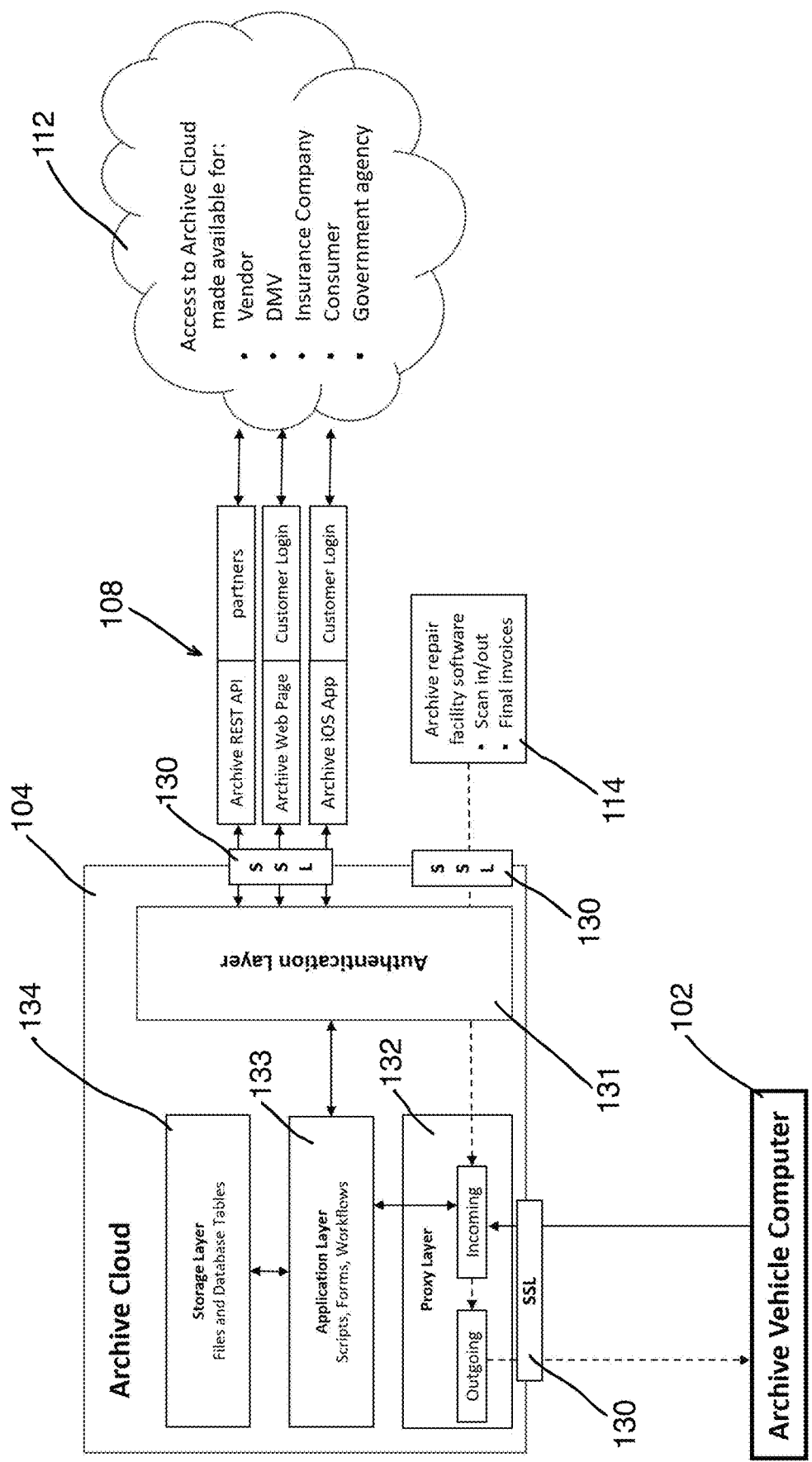
FIG. 14 is a diagram of a user device securely interacting and receiving vehicle data via a cloud service or server, in accordance with embodiments of the present invention.

Referring to FIGS. 13-14, the communication and secure interactions between the cloud server 104 and various user computing devices and the vehicle computing module 102 are detailed. Again, the communication elements C indicate areas of the system 100 representing data in flight created by back-end data transfers.

The cloud servers 104 act as proxies for the data which is processed into background databases 104*a* in a secure database zone behind a DMZ, in a separate data system that provides role-based access to the data. A proxy layer 132 transfers the information through to an application layer 133, and on to a storage or database layer 134 that provides encryption of data at rest. The application layer 133 can include a web or like application that allows access to the data in the cloud server 104.

As detailed herein, the cloud server 104 includes CRUD permission controls. For creating or writing, APIs from data producers (e.g., invoicing software, OBD scanners, uploaded telematics data uploaded by the vehicle computer 102, and the like) have creation or writing access. Read-only access is assigned to various consumer entities or users (e.g., vendors, DMVs, insurance companies, consumers, agencies, and the like). Like with the vehicle computer 102, update access and delete access are allowed by system administrators only for the cloud server 104, with file system and database audit logging enabled.

The system 100, therefore, considers the security controls of the files moving from place to place in the system (e.g., data in flight), and then addresses the second security requirement of encrypting the data at rest. This means black hat actors cannot read the data when it is in flight, nor the sensitive data stored in the cloud database 104a. Databases of the system 100 are incredibly important as they are where the sensitive data is stored. The DMZ provides protection such that additional firewall rules are required to gain access or connect to the database 104a. Accordingly, the database 104a is the furthest point away from the Internet, at the storage layer 134. If hackers attack the application layer 133, there is still another layer of security protecting the data. Moreover, encryption of the data at rest means that even if the database 104a is hacked and accessed, the data is unusable.

The system 100 should satisfy at least two conditions to be viable: system availability and usability (e.g., ease of use). Regarding availability, applications and software features that allow access to the data can be available under a "five-nine's SLA", or a service level agreement stating the system is available 99.999% of the time, for example. Regarding usability, consumers are particularly savvy about the usability of apps on their mobile devices. The system 100 is configured to provide positive user experiences (UX), as it integrates and interacts with modern and native mobile applications for the top two mobile manufacturers (e.g., Apple™ and Android™).

Referring specifically to FIG. 13, the system 100 includes one or more load balancers 140, the one or more cloud servers 104, the one or more databases 104a, and a user interface at the linking element 108—such as a web-based user interface (e.g., WebUI) or a mobile app-based user interface (e.g., AppUI). For logistical and legal reasons, the data can be segregated by OEMs so that back-end data loads of build sheets, procedures, and parts lists can be controlled by separate administrative service accounts. A security layer S is provided intermediate the vehicle computing devices 102 and the load balancer layer 140. Security features can include the SSL certificate features detailed herein, HTTPS, SSH, and 2FA (two-factor authentication).

The cloud servers 104 for various embodiments of the present invention can employ Virtual Private Clouds (VPCs) 144 provided by web service companies, such as Amazon Web Services (AWS). This logical separation can be achieved by employing other systems and techniques, including CRM systems (customer relationship management like SalesForce™), ITSM systems (IT Service Management like ServiceNow™), and the like. As such, top-performing WebUI and AppUI user experiences are provided with many of the features required by the system 100. The system 100 provides a wide breadth of features centered around user experience, data security, data segregation, and user/group/role functionality.

Accordingly, the system 100 can implement an application development environment to leverage software-as-a-service (SaaS) platform features and stay in an auditable posture regarding system security. Exemplary services and features can include: (1) LDAP integration, (2) REST API integration, (3) users, groups, and group memberships, (4) role-based security of features and data tables, (5) access control lists (ACL), (6) security features controlling table access by role, (7) Internet-facing ACLs, (8) forms-based workflow, (9) scoped applications, (10) call/incident/problem/change/request ticketing systems, (11) SSL security of the web UI, (12) database encryption, (13) reports and dashboards, (14) uptime SLA, (15) automated backups, (16) updated set technology to control promotion of code changes to production from sub-environments used to perform development, etc.

Various services available to provide cloud resources and building applications in the cloud can include AWS™, Google™, Azure™, IBM™, Oracle™ and the like. Further, porting the applications to another cloud provider is not a difficult endeavor. Various embodiments of the cloud service features envisioned for use with the system 100 can include: security groups (e.g., firewall rules), user management (e.g., IAM), virtual servers implemented as virtual machines (VMs) (e.g., EC2), and elastic server scaling (e.g., load balancing). Exemplary VM embodiments for the cloud servers 104 can be deployed on a LAMP server, including a Linux operating system, Apache Web server, MySQL database (e.g., MariaDB), PHP web extensions, etc. As described herein, encryption of data at rest can be included with various aspects of the system 100, regardless of the cloud services utilized.

Because of the detailed aspects and features of the present invention described herein, the system 100 is capable of scaling to hundreds of millions of vehicles, hundreds of millions of users, and at a constant cadence of connection and upload/download requests. The system 100 can implement the proxy layer to handle all file movements, and to provide another level of separation between the file transfer depot and the application database 104a. As such, the proxy layer is locked down, except for cloud service administrators who may enter infrequently after software deployments or to diagnose and resolve issues.

FIG. 14 shows exemplary application components, functionality, and the flow of data for the cloud server 102 and computing devices and users in communication with the cloud server 102. Again, the system 100 is configured with top-quality security systems to harden the network and protect from hacks and attacks.

The authentication layer 131, in line after and operatively coupled with the proxy layer 132, determines whether the user is who they say they are. Namely, positive identification with user ID and password entries, 2FA authentication, and a myriad of other authentication techniques can be employed with the system 100. In certain embodiments, authenticator mobile apps and software can be incorporated to provide ID verification with this process of the system 100, as well as corporate-level FOB login/authentication techniques and hardware. Various commercial authenticators, such as the Google Authenticator app, OneLogin OTP and onelogin.com, are envisioned for use with the present invention. With such mobile apps, a user cannot log in to the system 100 without the app and the phone it was installed on.

The system 100 separates the proxy layer 132 from the application layer 133 to improve scalability and UI and API performance. This separates cloud providers and accounts. With encryption for data in flight via SSL connections 130, the integrated business application platforms of the system 100 provide valuable features like role-based security and encryption for data at rest in an encrypted database 104a. The cloud-based focus of the present invention permits the system 100 to take advantage of the latest HTML and security technology, securely storing a very large set of important data.

The cloud application layer 133 of the cloud server 104 can be implemented for the purposes of scaling on a larger application server SaaS (software as-a-service) provider, such as ServiceNow™, with full application server uptime SLAs. These cloud services also provide sophisticated support, administration, login access control for customers, troubleshooting, and quick response rates.

Figure 15:
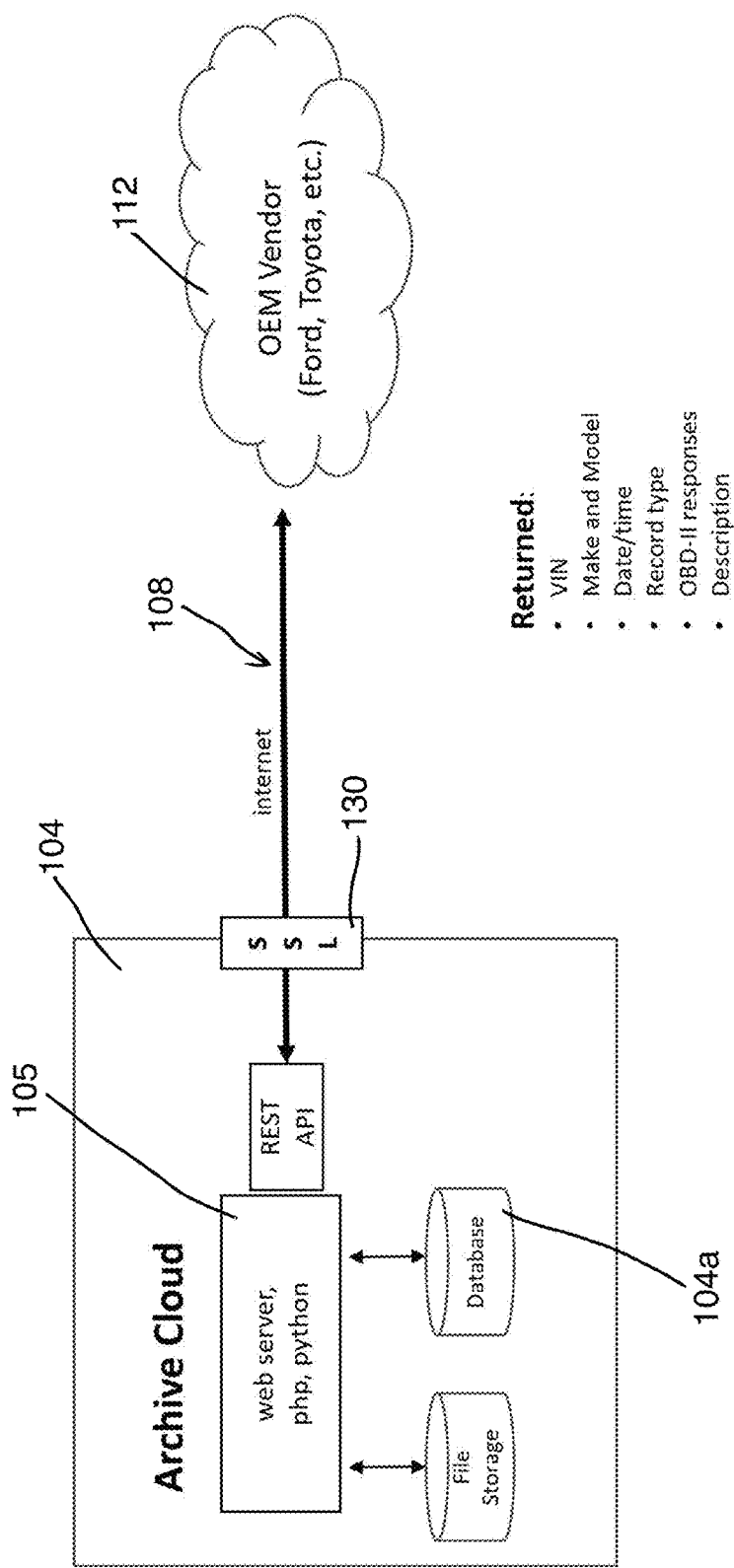
FIG. 15 is a diagram of a vehicle manufacturer user device securely interacting and receiving vehicle data via a cloud service or server, in accordance with embodiments of the present invention.

FIGS. 15-18 illustrate secure communication and interaction between user devices 112 and the cloud service or server 104. For instance, the embodiment of FIG. 15 shows the vehicle manufacturer devices 112 of the present invention 100 communicating with and receiving the following from the server 104 via a secure SSL Internet connection 130: a vehicle VIN, vehicle make and model, the date and time, the record type, the OBD-II response, and descriptions.

Figure 16:
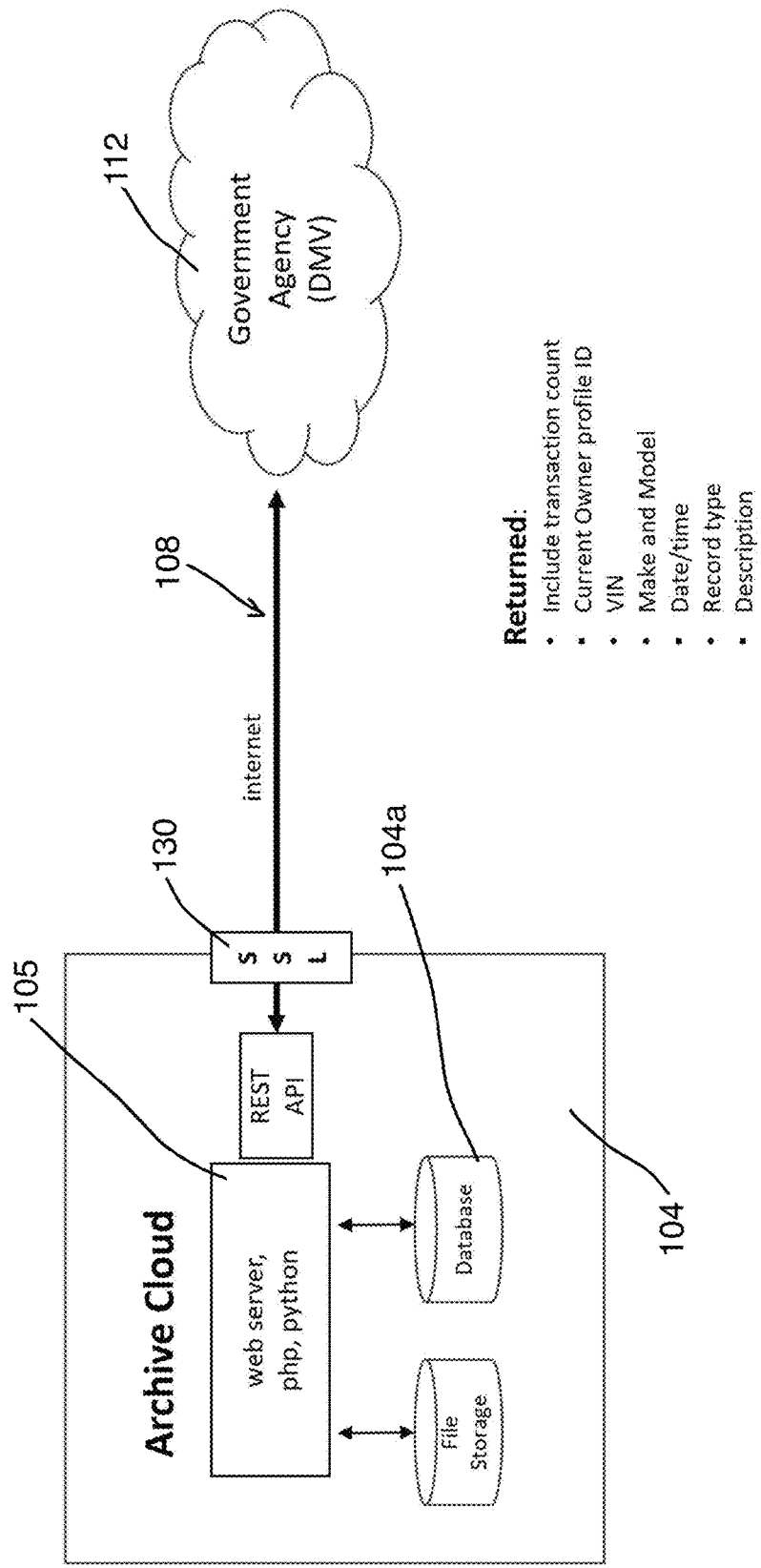
FIG. 16 is a diagram of an agency user device securely interacting and receiving vehicle data via a cloud service or server, in accordance with embodiments of the present invention.

The embodiment of FIG. 16 shows that a government agency device 112, such as the DMV, can communicate and receive the following information via a secure Internet SSL connection 130: a transaction count, current vehicle owner profile ID, the vehicle VIN, the vehicle make and model, the date and time, the record type, and descriptions.

Figure 17:
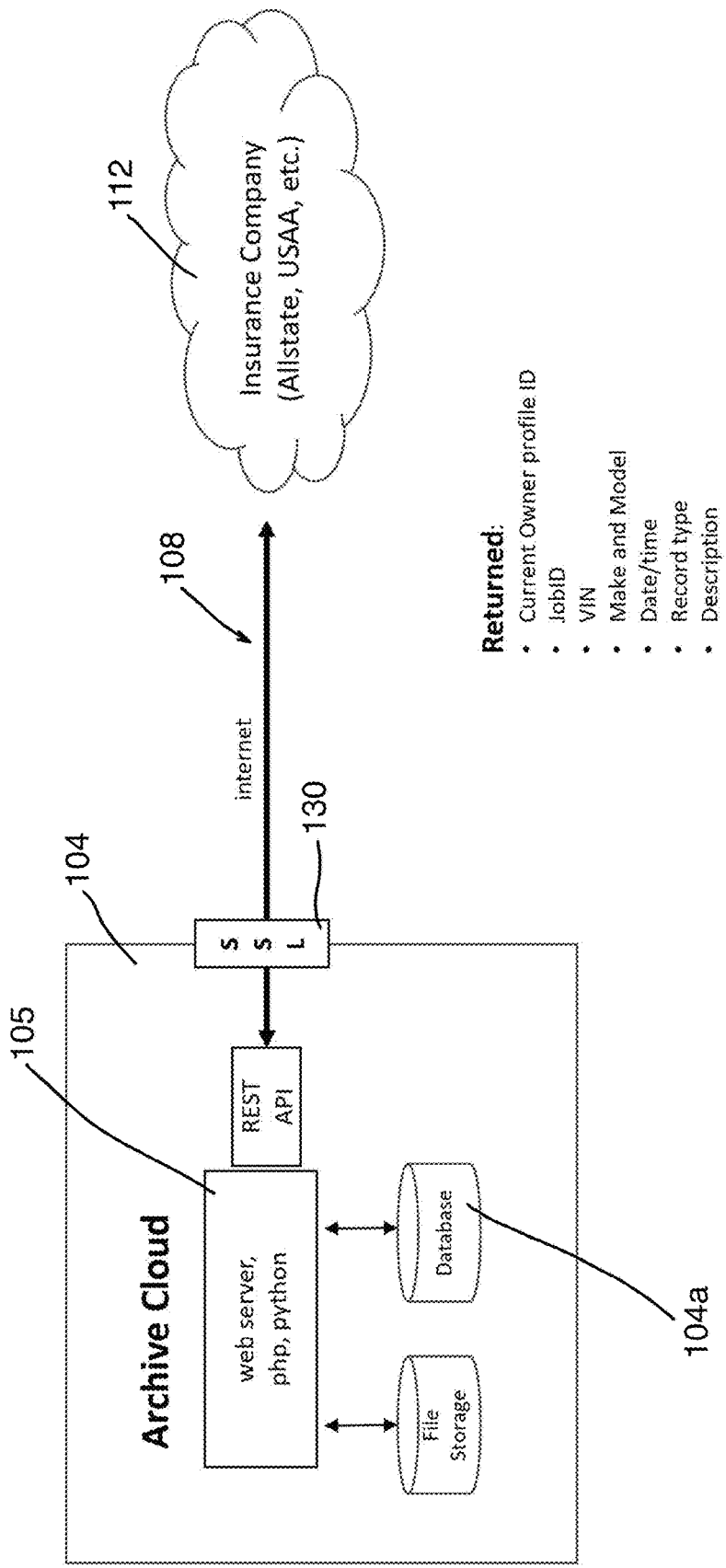
FIG. 17 is a diagram of an insurance company user device securely interacting and receiving vehicle data via a cloud service or server, in accordance with embodiments of the present invention.

FIG. 17 provides a diagram of the following data an insurance company device 112 can communicate and receive via a secure Internet SSL connection 130 in example embodiments: a current owner profile ID, a job ID, the vehicle VIN, the vehicle make and model, the date and time, the record type, and descriptions.

Figure 18:
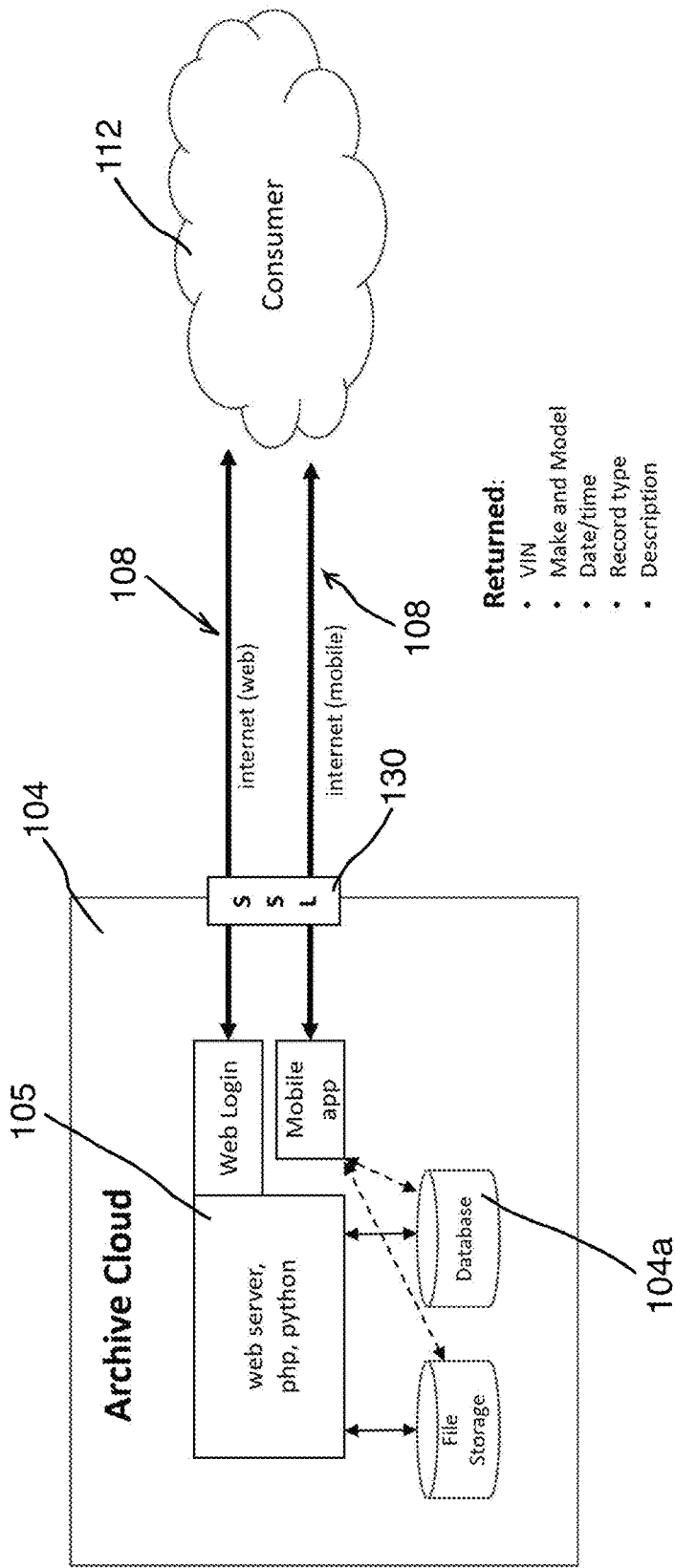
FIG. 18 is a diagram of a consumer user device securely interacting and receiving vehicle data via a cloud service or server, in accordance with embodiments of the present invention.

The embodiment of FIG. 18 illustrates the following information that can be communicated and received from the cloud server 104 by a consumer device 112 via a secure SSL connection 130: the vehicle VIN, the vehicle make and model, the date and time, the record type, and descriptions. Like other disclosed methods and means for communication between the computing devices 112, 114 and the cloud server 104, the exemplary communication and data access can securely occur over the Internet via a web app or a mobile app.

Figure 19:
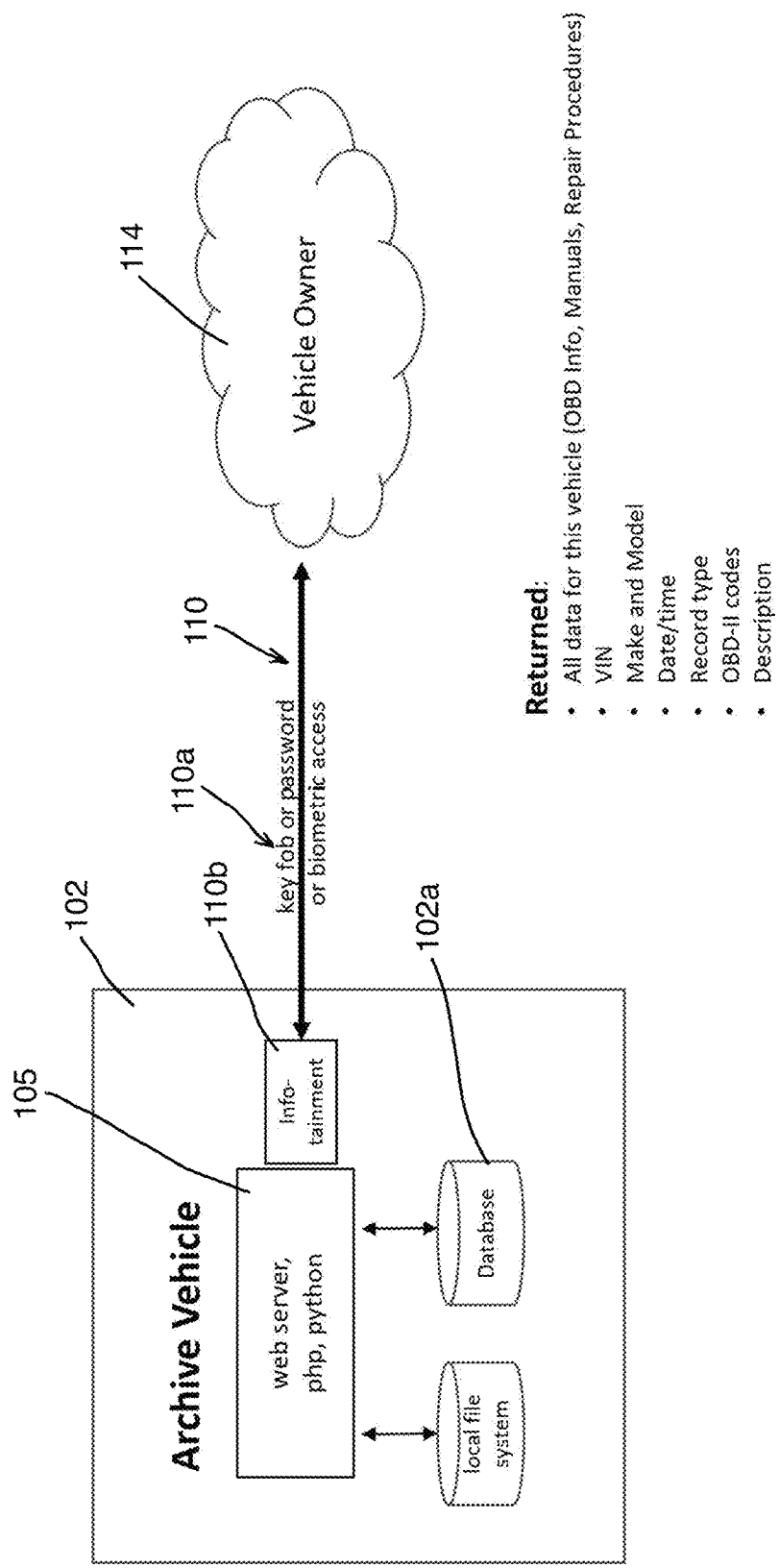
FIG. 19 is a diagram of a vehicle owner securely interacting and receiving vehicle data via a vehicle and/or a vehicle data computing module, in accordance with embodiments of the present invention.
Figure 20:
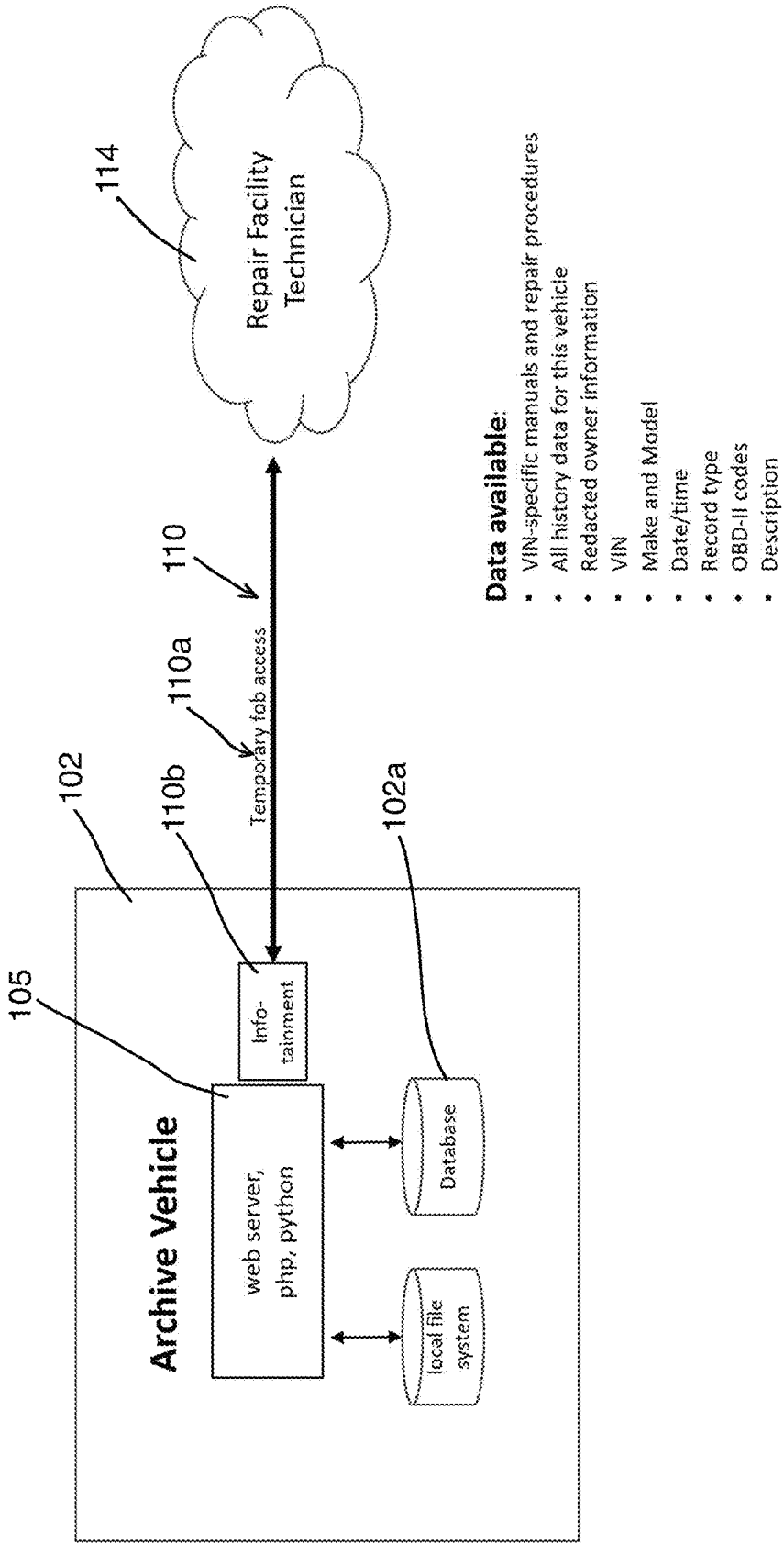
FIG. 20 is a diagram of a repair technician user device securely interacting and receiving vehicle data via a vehicle data computing module, in accordance with embodiments of the present invention.

FIGS. 19-20 illustrate operative communication and interactions between user devices 114, such as vehicle owner and repair technician devices, and the vehicle computing module 102. Access and communication between the device 114 and the module 102 can be facilitated via key FOB access, biometric access controls, a technician's scanner or device, and other available and secure techniques. Referring to FIG. 19, data or information returned to the vehicle owner can include all data for the subject vehicle (OBD info, manuals, repair procedures, etc.), the vehicle VIN, the vehicle make and model, date and time data, the record type, the OBD-II codes, descriptions, and the like. The embodiment of FIG. 20 shows communication with and data returned to the repair facility technician, via temporary FOB access provided by the vehicle owner. The data or information received can include the VIN-specific manuals and repair procedures, all history data for the vehicle, redacted owner information, the vehicle VIN, the vehicle make and model, data and time data, the record types, OBD-II codes, descriptions, and the like.

As detailed above, various devices or computing systems 102, 106, 112, 114 can be included and adapted to process and carry out the aspects, computations, storage events, and algorithmic processing of the system 100. Computing systems and devices of the present invention may include a processor, which may include one or more microprocessors and/or one or more circuits, such as an application specific integrated circuit (ASIC), field-programmable gate arrays (FPGAs), etc. Further, the devices can include a network interface. The network interface is configured to enable communication with the network (such as the Internet), other devices and systems, and servers, using a wired and/or wireless connection.

The devices or computing systems may include memory, such as non-transitive memory, which may include one or more non-volatile storage devices and/or one or more volatile storage devices (e.g., random access memory (RAM)). In instances where the devices include a microprocessor, computer readable program code may be stored in a computer readable medium or memory, such as, but not limited to storage media (e.g., a hard disk or solid-state drive), memory devices (e.g., random access memory, flash memory), etc. The computer program or software code can be stored on a tangible, or non-transitive, machine-readable medium or memory. In some embodiments, computer readable program code is configured such that when executed by a processor, the code causes the computing device to perform the steps described and depicted above and herein. In other embodiments, the device is configured to perform steps described herein without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

Certain computing devices disclosed herein may include an input device. The input device is configured to receive an input from either a user or a hardware or software component—as disclosed herein in connection with the various user interface or data inputs. Examples of an input device include a keyboard, mouse, microphone, touch screen and software enabling interaction with a touch screen, etc. The devices can also include an output device. Examples of output devices include displays, televisions, mobile device screens, tablet screens, speakers, remote screens, etc. The output device can be configured to display images, media files, text, or video, or play audio to a user through speaker output.

The disclosed server systems 104 of the present invention can include one or more microprocessors, and/or one or more circuits, such as an application specific integrated circuit (ASIC), field-programmable gate arrays (FPGAs), etc. A network interface can be configured to enable communication with the network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to storage media (e.g., a hard disk or solid-state drive), memory devices, etc.

Aspects of the present invention can be embodied as software code residing on the servers 104 or other computing devices 102, 112, 114 (e.g., the vehicle computing module, a desktop, a tablet, a smartphone, a specialized technician device, etc.). The data of the present invention can be included on and transferred to and from a storage area network (SAN), a data cloud or database, or any computing device for storing the file or files being uploaded, downloaded, or processed.

Aspects of the software code of the invention can take the form of a plugin or app, and can interface with various protocols or software using APIs or other means of interacting with computing software and systems.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

While the methods, steps, and processing described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A system of facilitating access to vehicle data, comprising:
   a vehicle electronic control unit;
   a cloud storage system configured to store at least vehicle data, the cloud storage system including an application layer and a secured storage layer;
   at least one user computing device in operative communication with the cloud storage system via a secure user communication channel; and
   a vehicle analysis computing module in operative communication with the vehicle electronic control unit and the cloud storage system, the vehicle analysis computing module in operative secure communication with the cloud storage system via a secure vehicle communication channel and configured to process the vehicle data and transfer the vehicle data to the cloud storage system, prohibiting access to the vehicle data by computing devices intermediate the vehicle analysis computing module and the cloud storage system, with the vehicle analysis computing module further configured to facilitate restricted read-only access to the vehicle data at the vehicle analysis computing module.

2. The system of claim 1, wherein the cloud storage system includes a proxy layer in line prior to the application layer.

3. The system of claim 1, further including a load balancer layer intermediate the vehicle analysis computing module and the application layer of the cloud storage system.

4. The system of claim 1, wherein the cloud storage system includes one or more virtual private cloud (VPC) environments.

5. The system of claim 4, wherein the one or more VPC environments are configured to store, and to facilitate secure controlled access by one or more original equipment manufacturers (OEM) to, the vehicle data.

6. The system of claim 1, wherein the cloud storage system further includes an authentication layer provided intermediate the application layer and the at least one user computing device.

7. The system of claim 1, wherein the secure user communication channel includes secure internet connection technology.

8. The system of claim 1, wherein the secure vehicle communication channel includes secure internet connection technology.

9. The system of claim 1, wherein the secured storage layer includes an encrypted database.

10. The system of claim 1, further including a vehicle technician computing device in operative communication with the cloud storage system or the vehicle analysis computing module via a secure repair communication channel.

11. The system of claim 10, wherein the vehicle technician computing device includes a device selected from the group consisting of a tablet, a smartphone, a desktop computing device, and a handheld scanning device.

12. The system of claim 1, wherein the vehicle analysis computing module includes a secure vehicle database.

13. The system of claim 12, wherein the secure vehicle database includes personal vehicle owner data.

14. The system of claim 13, wherein a vehicle technician computing device is provided selective secure access to the personal vehicle owner data in the secure vehicle database.

15. A system of facilitating access to vehicle data, comprising:
    a cloud server system adapted to store and facilitate access to vehicle data, the cloud storage system including a secure storage layer having an encrypted database;
    a first user device in operative secure communication with the cloud server system;
    a second user device in operative secure communication with the cloud server system; and
    a vehicle computing module in operative communication with a vehicle electronic control unit and the cloud server system, the vehicle computing module configured to process the vehicle data and transfer the vehicle data to the cloud server system for storage at the encrypted database, prohibiting access to the vehicle data by computing devices intermediate the vehicle computing module and the cloud server system, with the vehicle computing module further configured to facilitate restricted read-only access to the vehicle data at the vehicle computing module.

16. The system of claim 15, wherein the cloud server system includes one or more virtual private cloud (VPC) environments.

17. The system of claim 16, wherein the one or more VPC environments are configured to store, and to facilitate secure controlled access by one or more original equipment manufacturers (OEMs) to, the vehicle data.

18. The system of claim 15, wherein the first user device and the second user device are in operative secure communication with the cloud server system via secure internet connection technology.

19. The system of claim 15, further including a vehicle technician computing device in operative communication with the cloud server system or the vehicle computing module via a secure repair communication channel.

20. The system of claim 15, wherein the vehicle computing module includes a secure vehicle database configured to store the vehicle data and personal vehicle owner data.

* * * * *